United States Patent
Chakraborty et al.

(10) Patent No.: US 9,603,110 B2
(45) Date of Patent: Mar. 21, 2017

(54) ADAPTIVE FREQUENCY CORRECTION IN MULTIPLE RADIO DEVICES

(71) Applicant: QUALCOMM Incorporated, San Diego, CA (US)

(72) Inventors: Kaushik Chakraborty, San Diego, CA (US); Soumya Das, San Diego, CA (US); Olufunmilola Awoniyi-Oteri, San Diego, CA (US); Nitinkumar Sagarbhai Barot, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 232 days.

(21) Appl. No.: 14/600,481

(22) Filed: Jan. 20, 2015

(65) Prior Publication Data

US 2016/0212719 A1 Jul. 21, 2016

(51) Int. Cl.
*H04W 56/00* (2009.01)
*H04W 88/06* (2009.01)

(52) U.S. Cl.
CPC ....... *H04W 56/0005* (2013.01); *H04W 88/06* (2013.01)

(58) Field of Classification Search
CPC .......................... H04W 88/06; H04W 56/0005
See application file for complete search history.

(56) References Cited

U.S. PATENT DOCUMENTS

| | | | | |
|---|---|---|---|---|
| 2010/0214941 A1* | 8/2010 | Hoole | ................... | H04B 1/1027 370/252 |
| 2010/0273474 A1* | 10/2010 | Carmon | ............ | H04W 56/0035 455/424 |
| 2012/0184290 A1* | 7/2012 | Kazmi | ................... | G01S 5/0242 455/456.1 |
| 2012/0184302 A1* | 7/2012 | Kazmi | ................... | H04W 64/00 455/456.5 |
| 2013/0064219 A1* | 3/2013 | Siomina | ................ | G01S 5/0236 370/331 |
| 2013/0190006 A1* | 7/2013 | Kazmi | ................ | H04W 64/006 455/456.1 |

(Continued)

FOREIGN PATENT DOCUMENTS

| | | |
|---|---|---|
| CN | 101754468 A | 6/2010 |
| GB | 2504757 A | 2/2014 |

OTHER PUBLICATIONS

ISA/EP, International Search Report and Written Opinion of the International Searching Authority, Int'l. App. No. PCT/US2015/066743, May 11, 2016, European Patent Office, Rijswijk, NL, 11 pgs.

*Primary Examiner* — Ajay Cattungal
(74) *Attorney, Agent, or Firm* — Holland & Hart LLP

(57) ABSTRACT

A user equipment may identify one or more trigger factors associated with an assistance mode. The assistance mode may include a second radio associated with a second radio access technology (RAT) assisting a first radio associated with a first RAT. The UE may then measure a frequency offset between a first clock of the first radio and a second clock of the second radio based at least in part on the one or more trigger factors. The first clock may be associated with a first oscillator crystal, and the second clock may be associated with a second oscillator crystal. The UE may then store the frequency offset for use by the first radio and the second radio in the assistance mode.

30 Claims, 16 Drawing Sheets

(56) References Cited

U.S. PATENT DOCUMENTS

| | | |
|---|---|---|
| 2013/0195070 A1 | 8/2013 | Bashar et al. |
| 2013/0235738 A1 | 9/2013 | Siomina et al. |
| 2013/0344878 A1 | 12/2013 | Whinnett |
| 2014/0010196 A1 | 1/2014 | Shapira |
| 2014/0086084 A1* | 3/2014 | Bi .................. H04L 1/0026 370/252 |
| 2014/0094188 A1* | 4/2014 | Kazmi .............. G01S 5/0242 455/456.1 |
| 2014/0146732 A1* | 5/2014 | Olufunmilola ....... H04W 24/10 370/311 |
| 2014/0206341 A1* | 7/2014 | Siomina ........... H04W 36/0088 455/422.1 |
| 2014/0241219 A1 | 8/2014 | Patil et al. |
| 2014/0301361 A1* | 10/2014 | Koo ................. H04W 36/20 370/331 |
| 2015/0280888 A1* | 10/2015 | Karsi ............... H04L 5/0073 370/329 |
| 2016/0205678 A1* | 7/2016 | Fujishiro .......... H04W 72/048 370/254 |
| 2016/0212719 A1* | 7/2016 | Chakraborty ......... H04W 88/06 |
| 2016/0212766 A1* | 7/2016 | Fujishiro .......... H04W 74/006 455/41.2 |

* cited by examiner

ADAPTIVE FREQUENCY CORRECTION IN MULTIPLE RADIO DEVICES

BACKGROUND

Field of the Disclosure

The present disclosure, for example, relates to wireless communications systems, and more particularly to cooperative use of wireless wide area network (WWAN) and wireless local area network (WLAN) components in a single device.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, space and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations or access points, each simultaneously supporting communication for multiple communication devices, otherwise known as user equipment (UEs), wireless terminals or stations (STAs). A base station or access point may communicate with UEs or STAs on downlink channels (e.g., for transmissions from a base station/access point to a UE/STA) and uplink channels (e.g., for transmissions from a UE/STA to a base station/access point). Communication between a UE and a base station may use a WWAN, while communication between a STA and an access point may use a WLAN. Wi-Fi is an example of a common WLAN technology supported by a STA. In the following, communication devices that communicate using both WWAN and WLAN may be generically referred to as a UE.

UEs typically include different WWAN and WLAN radios. The WWAN and WLAN radio subsystems may be driven by reference clocks generated by different oscillators. Each reference clock may have different frequencies and frequency errors. Thus, when a UE application shares both WWAN and WLAN resources, the different frequencies and frequency errors of the different radio subsystems may result in additional errors. Conventional methods for estimating and correcting a frequency offset between the different reference clocks of WWAN and WLAN subsystems may be complex and add latency to the system.

SUMMARY

A UE may include multiple radios that may generally be used for different radio access technologies (RATs). For example, a UE may include WWAN and WLAN radios. The multiple radios may share resources when the UE utilizes an assistance mode, which may be, for example, when a WLAN radio is used to assist a WWAN radio. Thus, and for example, a WLAN radio may be used to assist a WWAN radio during inter-frequency search and measurement operations. Similarly, a WLAN radio may assist a WWAN radio if the UE includes multiple Subscriber Identity Modules (SIM) and operates in either dual SIM/dual standby (DSDS) or dual SIM/dual active (DSDA) modes. A WLAN radio may also assist a WWAN radio during carrier aggregation operations on a downlink or on both a downlink and an uplink. During UE operation in an assistance mode, each of the radios may have separate reference clocks associated with separate oscillator crystals. The UE may identify one or more trigger factors associated with the assistance mode. The UE may then measure a frequency offset between a first clock of the first radio and a second clock of the second radio based at least in part on the one or more trigger factors. The frequency offset may then be stored for use by the first radio and the second radio when the UE is in the assistance mode.

In a first illustrative embodiment, a method for wireless communications by a UE is disclosed. the method may include identifying one or more trigger factors associated with an assistance mode, wherein a second radio associated with a second RAT is used to assist a first radio associated with a first RAT. The method may also include measuring a frequency offset between a first clock of the first radio and a second clock of the second radio based at least in part on the one or more trigger factors, the first clock being associated with a first oscillator crystal, and the second clock being associated with a second oscillator crystal. The method may additionally include storing the frequency offset for use by the first radio and the second radio in the assistance mode.

In an aspect, the method may further include initiating the assistance mode of the first radio and the second radio based at least in part on the one or more trigger factors. The initiating of the assistance mode may include sending, from the first radio to the second radio, a request for assistance. The first RAT may include WWAN technology and the second RAT may include WLAN technology. The one or more trigger factors may include a length of a sleep cycle for the first radio or the second radio, and the method may further include triggering the measurement of the frequency offset periodically based at least in part on the length of the sleep cycle.

In another aspect, the one or more trigger factors may include an expected time for the first radio to initiate the assistance mode with the second radio, and the method may further include triggering the measurement of the frequency offset prior to the expected time. The method may also include determining the expected time based at least in part on signal strength measurements for one or more target frequencies of a carrier aggregation mode. The method may also include determining the expected time based at least in part on a received page for a SIM in a multiple active SIM mode. Alternatively or additionally, the method may include determining the expected time based at least in part on serving cell measurements. The serving cell measurements may indicate the UE is moving away from the serving cell.

In another aspect, the method may further include measuring the frequency offset between the first clock and the second clock based at least in part on a previously stored frequency offset. The measuring of the frequency offset may further include determining a sleep duration of the first radio or the second radio, and adjusting the previously stored frequency offset based at least in part on the sleep duration.

In yet another aspect, the method may further include measuring the frequency offset between the first clock and the second clock based at least in part on a latching interval of the first clock. The method may further include counting a number of cycles of the second clock occurring during the latching interval of the first clock. The latching interval of the first clock may be adjusted based at least in part on an active time of the second radio. The adjustment may include decreasing the latching interval of the first clock based at least in part on a low active time of the second radio, or increasing the latching interval of the first clock based at least in part on a high active time of the second radio.

In still another aspect, the method may further include measuring a first frequency error of the first oscillator crystal, measuring a second frequency error of the second oscillator crystal, determining an initial frequency offset based at least in part on the first frequency error and the second frequency error, and storing the initial frequency offset. The frequency offset between the first clock and the second clock may be based at least in part on the stored initial frequency offset. The method may further include measuring the first frequency error of the first oscillator crystal and the second frequency error of the second oscillator crystal in a controlled environment at a constant temperature. The method may include collecting samples by the second radio in the assistance mode, and adjusting the collected samples based at least in part on the frequency offset.

In a second illustrative embodiment, an apparatus for wireless communication is disclosed. The apparatus may include means for identifying one or more trigger factors associated with an assistance mode, wherein a second radio associated with a second RAT is used to assist a first radio associated with a first RAT. The apparatus may also include means for measuring a frequency offset between a first clock of the first radio and a second clock of the second radio based at least in part on the one or more trigger factors, the first clock being associated with a first oscillator crystal, and the second clock being associated with a second oscillator crystal. The apparatus may additionally include means for storing the frequency offset for use by the first radio and the second radio in the assistance mode. The one or more trigger factors may include an expected time for the first radio to initiate the assistance mode with the second radio, while the apparatus may further include means for triggering the measurement of the frequency offset prior to the expected time.

In an aspect, the apparatus may further include means for measuring the frequency offset between the first clock and the second clock based at least in part on a previously stored frequency offset. The means for measuring the frequency offset may further include means for determining a sleep duration of the first radio or the second radio, and means for adjusting the previously stored frequency offset based at least in part on the sleep duration.

In another aspect, the apparatus may further include means for measuring the frequency offset between the first clock and the second clock based at least in part on a latching interval of the first clock. The apparatus may further include means for adjusting the latching interval of the first clock based at least in part on an active time of the second radio.

In a third illustrative embodiment, an apparatus for wireless communication is disclosed. The apparatus may include a processor, memory in electronic communication with the processor, and instructions stored in the memory. The instructions may be executable by the processor to identify one or more trigger factors associated with an assistance mode, wherein a second radio associated with a second RAT is used to assist a first radio associated with a first RAT. The instructions may also be executable by the processor to measure a frequency offset between a first clock of the first radio and a second clock of the second radio based at least in part on the one or more trigger factors, the first clock being associated with a first oscillator crystal, and the second clock being associated with a second oscillator crystal. The instructions may also be executable by the processor to store the frequency offset for use by the first radio and the second radio in the assistance mode.

In an aspect, the one or more trigger factors may include an expected time for the first radio to initiate the assistance mode with the second radio, and the instructions may be further executable by the processor to trigger the measurement of the frequency offset prior to the expected time. The instructions may also be further executable by the processor to measure the frequency offset between the first clock and the second clock based at least in part on a previously stored frequency offset.

In yet another illustrative embodiment, a non-transitory computer-readable medium storing computer-executable code for wireless communication is disclosed. The code may be executable by a processor to identify one or more trigger factors associated with an assistance mode, wherein a second radio associated with a second RAT is used to assist a first radio associated with a first RAT. The code may also be executable by the processor to measure a frequency offset between a first clock of the first radio and a second clock of the second radio based at least in part on the one or more trigger factors, the first clock being associated with a first oscillator crystal, and the second clock being associated with a second oscillator crystal. Additionally, the code may be executable by the processor to and store the frequency offset for use by the first radio and the second radio in the assistance mode.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

A WWAN radio and a WLAN radio may share resources during an assistance mode. The WWAN radio and the WLAN radio may each have a reference clock. In some situations, the WWAN and WLAN radios may share a common reference clock. However, in other situations, the WWAN and WLAN radios may each use separate reference clocks. In situations when the WWAN and WLAN radios use different reference clocks, the tolerances of the different reference clocks may differ between WWAN and WLAN radios. For example, a WWAN radio may have more restrictive tolerances than a WLAN radio. Thus, the sharing of resources by a WWAN radio and a WLAN radio during an assistance mode may result in WWAN communications, for example, that are clocked by a reference clock that is not within the tolerances for the WWAN radio.

In order to solve this potential challenge, a frequency control subsystem may measure the frequency of each of the reference clocks in the WWAN and WLAN radios of a UE and correct for frequency differences when the WWAN radio and the WLAN radio are in the assistance mode. The performance of the frequency control subsystem may be improved by using one or more of the following operations: 1) measuring the reference clocks before a request for assistance is issued (to access the assistance mode); 2) storing the frequency offset counter state during WLAN sleep cycles and restoring a previous frequency offset counter state at WLAN power up; and 3) adapting a latching interval used for the frequency measurement to reduce frequency error over time.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Figure 1:
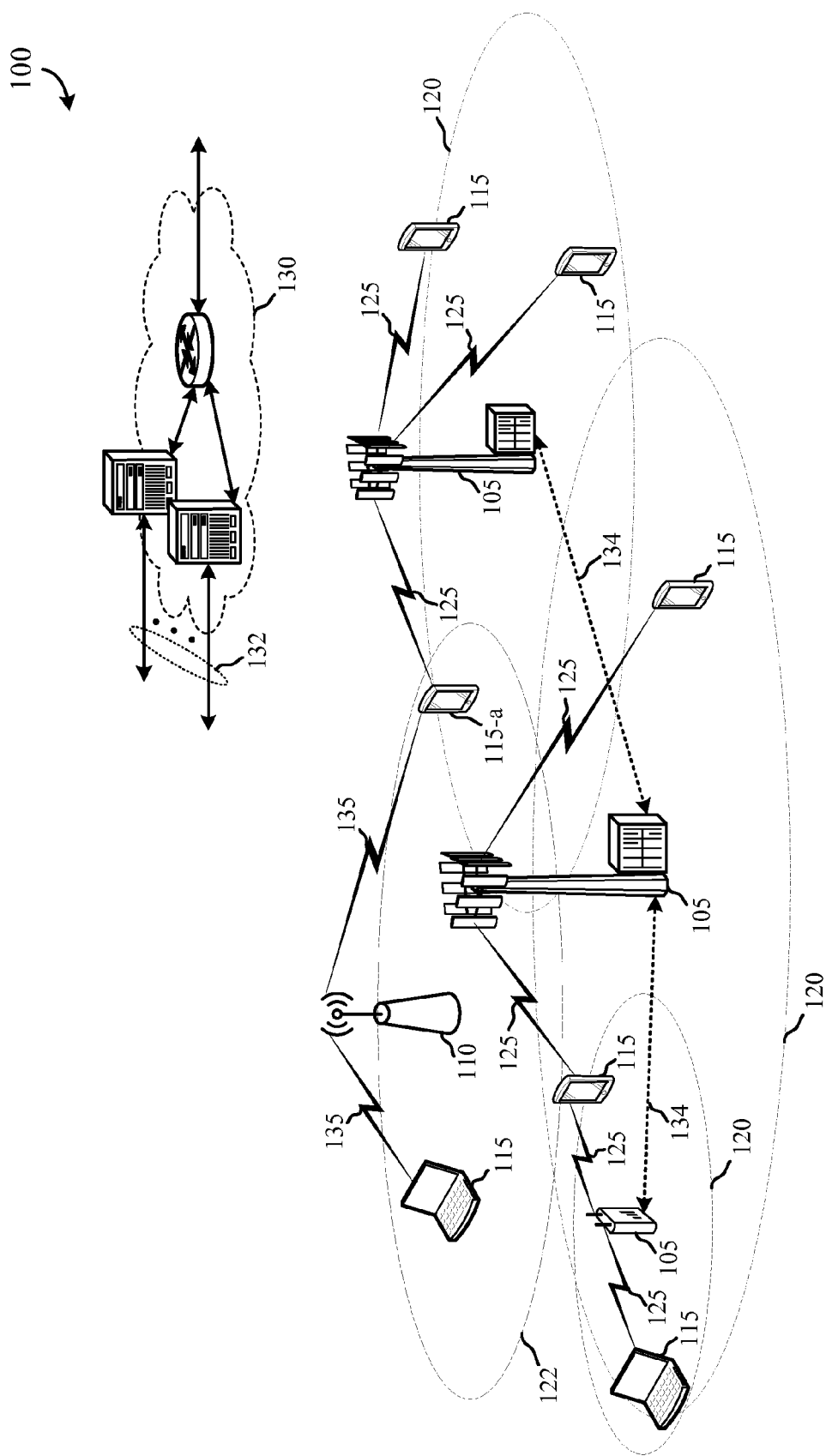
FIG. 1 illustrates an example of a wireless communications system in accordance with various aspects of the disclosure.

FIG. 1 illustrates an example of a wireless communications system 100 in accordance with various aspects of the disclosure. The wireless communications system 100 includes base stations 105, UEs 115, and a core network 130. The core network 130 may provide user authentication, access authorization, tracking, Internet Protocol (IP) connectivity, and other access, routing, or mobility functions. The base stations 105 interface with the core network 130 through network links 132 (e.g., S1, etc.) and may perform radio configuration and scheduling for communication with the UEs 115, or may operate under the control of a base station controller (not shown). In various examples, the base stations 105 may communicate, either directly or indirectly (e.g., through core network 130), with each other over backhaul links 134 (e.g., X1, etc.), which may be wired or wireless communication links.

The base stations 105 may wirelessly communicate with the UEs 115 via one or more base station antennas. Each of the base station 105 sites may provide communication coverage for a respective geographic coverage area 120. In some examples, base stations 105 may be referred to as a base transceiver station, a radio base station, an access point, a radio transceiver, a NodeB, eNodeB (eNB), Home NodeB, a Home eNodeB, or some other suitable terminology. The geographic coverage area 120 for a base station 105 may be divided into sectors making up only a portion of the coverage area (not shown). The wireless communications system 100 may include base stations 105 of different types (e.g., macro and/or small cell base stations). There may be overlapping geographic coverage areas 120 for different technologies.

In some examples, the wireless communications system 100 is a Long Term Evolution (LTE) or LTE-Advanced (LTE-A) network. In LTE/LTE-A networks, the term eNB may be generally used to describe the base stations 105. The wireless communications system 100 may be a Heterogeneous LTE/LTE-A network in which different types of eNBs provide coverage for various geographical regions. For example, each eNB or base station 105 may provide communication coverage for a macro cell, a small cell, and/or other types of cell. The term "cell" is a term used by an organization named "3rd Generation Partnership Project" (3GPP) to describe a base station, a carrier or component carrier associated with a base station, or a coverage area (e.g., sector, etc.) of a carrier or base station, depending on context.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell may cover a relatively smaller geographic area and may allow unrestricted access by UEs with service subscriptions with the network provider. A femto cell also may cover a relatively small geographic area (e.g., a home) and may provide restricted, unrestricted, or a hybrid of restricted and unrestricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communications system 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The UEs 115 are dispersed throughout the wireless communications system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless communications device, a remote device, a mobile subscriber station, an access terminal, a mobile terminal, a wireless terminal, a remote terminal, a handset, a user agent, a wireless device, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE 115 may be able to communicate with various types of base stations and network equipment including macro eNBs, small cell eNBs, relay base stations, and the like.

The communication links 125 shown in wireless communications system 100 may include uplink (UL) transmissions from a UE 115 to a base station 105, and/or downlink (DL) transmissions, from a base station 105 to a UE 115. The downlink transmissions may also be called forward link transmissions while the uplink transmissions may also be called reverse link transmissions. Each communication link 125 may include one or more carriers, where each carrier may be a signal made up of multiple sub-carriers (e.g., waveform signals of different frequencies) modulated according to the various radio technologies described above. Each modulated signal may be sent on a different sub-carrier and may carry control information (e.g., reference signals, control channels, etc.), overhead information, user data, etc. The communication links 125 may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

In some embodiments of the wireless communications system 100, base stations 105 and/or UEs 115 may include multiple antennas for employing antenna diversity schemes to improve communication quality and reliability between base stations 105 and UEs 115. Additionally or alternatively, base stations 105 and/or UEs 115 may employ multiple-input, multiple-output (MIMO) techniques that may take advantage of multi-path environments to transmit multiple spatial layers carrying the same or different coded data.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

Wireless communications system 100 includes a UE 115-a which is in communication with both a base station 105 (via communication link 125) and an access point 110 (via communication link 135). As an example, UE 115-a may communicate with the access point 110 using Wi-Fi or other WLAN communications, while the UE 115-a may communicate with the base stations 105 using LTE, GSM, or other WWAN communications. The communications may be at the same time. As an example, the UE 115-a may include multiple SIMs and may communicate with one base station 105 using LTE communications, another base station 105 using GSM communications, and an access point 110 using Wi-Fi communications. As another example, the UE 115-a may communicate with one base station 105 using LTE communications, the same base station 105 using GSM communications, and an access point 110 using Wi-Fi communications. The access point 110 may have an access point coverage area 122 overlapping with the geographic coverage areas 120 of the base stations 105.

The UE 115-a may include one or more WWAN radios. In the case that the UE 115-a includes a single WWAN radio, the single WWAN radio may be shared between multiple WWAN communications. For example, a first WWAN communication (such as an LTE communication) may utilize the WWAN radio during a first time period, and a second WWAN communication (such as a GSM communication) may utilize the WWAN radio during a second time period. When a WWAN communication facilitated by one SIM is utilizing the WWAN radio, the WWAN radio chains may be unavailable for use for different WWAN communications facilitated by different SIMs. Therefore, while the multiple WWAN communications are occurring, the UE 115-a may utilize a portion of a WLAN radio in the UE to offload a portion of the processing for one of the WWAN communications from the WWAN radio to the WLAN radio. In this way, the availability of the single WWAN radio may be increased.

Figure 2:
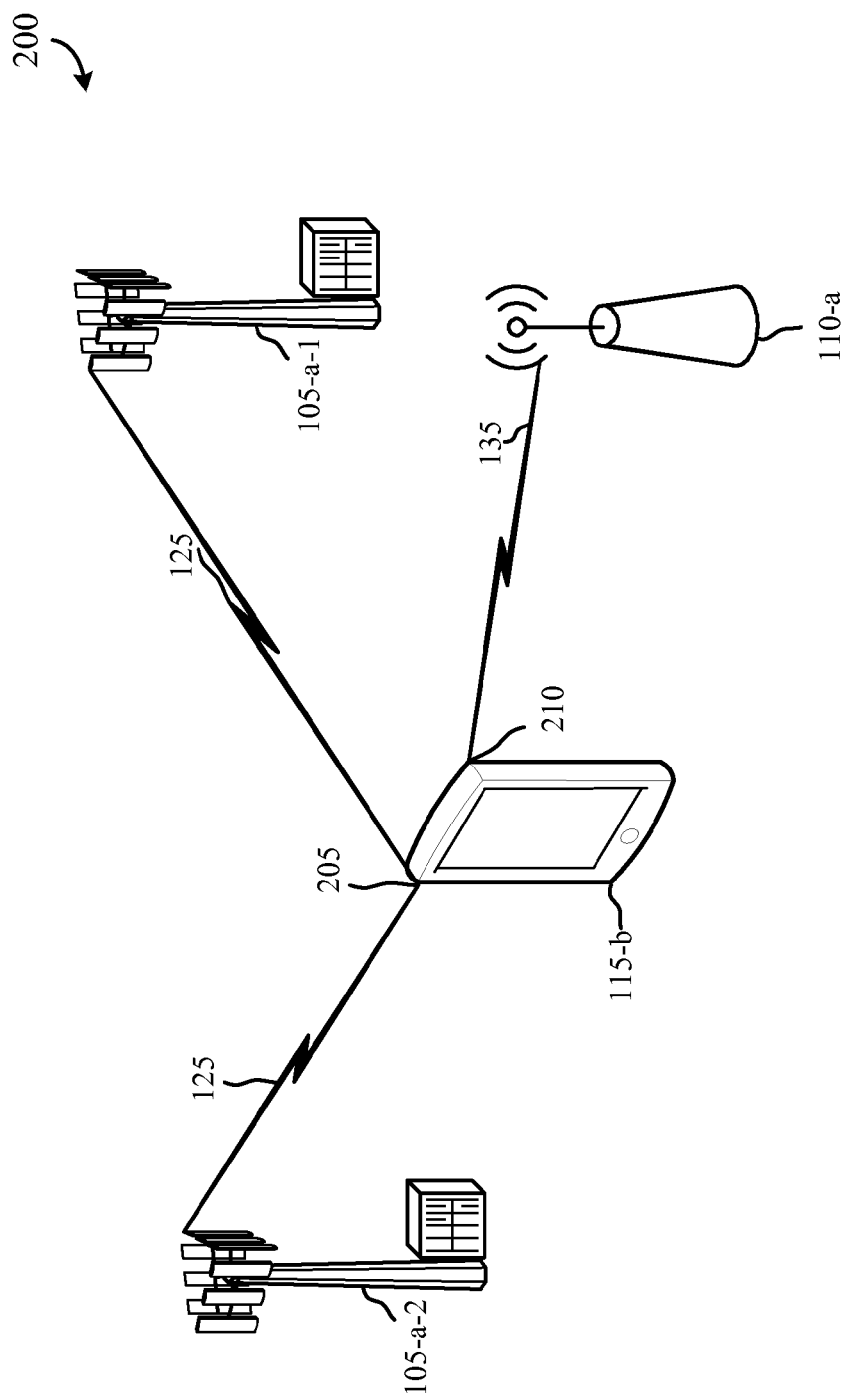
FIG. 2 illustrates a system diagram that shows an example of a wireless communications system.

FIG. 2 illustrates a system diagram that shows an example of a wireless communications system 200. The wireless communications system 200-a may include base stations 105-a-1, 105-a-2, access point 110-a and UE 115-b. The UE 115-b may be an example of UE 115-a in wireless communications system 100 of FIG. 1 and may be engaged in both WWAN and WLAN communications. The base stations 105-a-1, 105-a-2 may be examples of base stations 105 included in wireless communications system 100 of FIG. 1, and the access point 110-a may be an example of the access point 110 in wireless communications system 100 of FIG. 1.

In wireless communications system 200, the UE 115-b may include at least two different sets of antennas, WWAN antennas 205 and WLAN antennas 210. For example, WWAN antennas 205 may include a WWAN antenna associated with a WWAN radio. Using the WWAN antennas 205, the UE 115-b may engage in WWAN communications with base station 105-*a*-1 and base station 105-*a*-2 via communication links 125. The WWAN antennas 205 and associated WWAN radio may be used during WWAN communications. The WWAN antennas 205 may include one or more diversity WWAN antennas for WWAN communications with base station 105-*a*-1 and/or base station 105-*a*-2, where each WWAN communication supports a different SIM. The one or more diversity WWAN antennas 205 may also be used for WWAN communications with base station 105-*a*-1 and/or base station 105-*a*-2, where the WWAN communication supports one SIM in a carrier aggregation (CA) or multi-carrier mode.

In wireless communications system 200, the UE 115-*b* may use the WLAN antennas 210 to communicate with the access point 110-*a* (via communication link 135). The communications with the access point 110-*a* may be Wi-Fi or other WLAN communications. As described in greater detail below, the WLAN radio may assist the WWAN radio, or vice versa. For example, while a WWAN communication from base station 105-*a*-1 may be received by the WWAN antennas 205, the WWAN communication may be processed by a portion of the WLAN radio while the WWAN radio is processing a different WWAN communication from base station 105-*a*-2.

In some examples, accurate frequency synchronization between the WWAN and WLAN radios may be necessary for the WLAN radio to properly assist the WWAN radio.

For example, the WLAN radio may assist the WWAN radio in performing inter-frequency search and measurements by capturing RF samples for the WWAN radio. As another example, the WLAN radio may assist the WWAN radio in handling communications over a secondary SIM when multiple SIMs are active in the UE 115-*b*. As yet another example, the WLAN radio may assist the WWAN radio in supporting an additional carrier when the UE 115-*b* is in a carrier aggregation mode.

Figure 3:
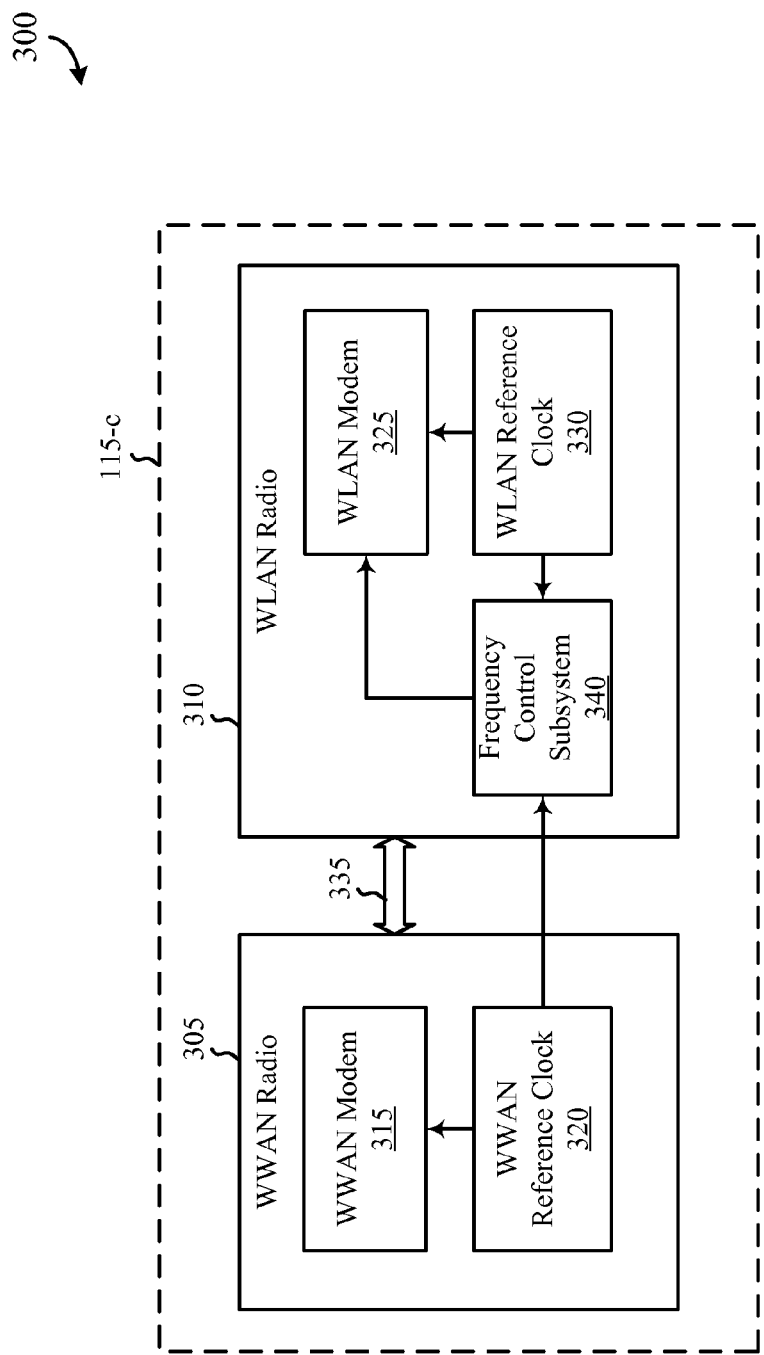
FIG. 3 shows a block diagram of a UE for use in wireless communications, in accordance with various aspects of the present disclosure.

FIG. 3 shows a block diagram 300 of a UE 115-*c* for use in wireless communications, in accordance with various aspects of the present disclosure. The UE 115-*c* may include a WWAN radio 305 and a WLAN radio 310. The WWAN radio 305 may include a WWAN modem 315 and a WWAN reference clock 320. The WLAN radio 310 may include a WLAN modem 325 and a WLAN reference clock 330. The WWAN radio 305 may request assistance from the WLAN radio 310 over a system bus 335. The system bus 335 may also be used to exchange information between the WWAN radio 305 and the WLAN radio 310, such as RF samples and frequency offset information.

The WWAN reference clock 320 and the WLAN reference clock 330 may have different frequency error requirements. For example, the WWAN reference clock 320 may have a frequency error requirement of 5 parts per million (ppm) and the WLAN reference clock 330 may have a frequency error requirement of 20 ppm. In this example, the max total error of both the WWAN reference clock 320 and the WLAN reference clock 330 would be +/−25 ppm. A frequency control subsystem 340 may be used to estimate and reduce the total frequency error of the WWAN reference clock 320 and the WLAN reference clock 330 to a significantly lower level. The frequency control subsystem 340 may be a module of the WLAN radio 310, as illustrated in FIG. 3. Alternatively, the frequency control subsystem 340 may be a module of the WWAN radio 305 or may be external to both the WLAN radio 310 and the WWAN radio 305. In the situation where the frequency control subsystem 340 is external to both the WLAN radio 310 and the WWAN radio 305, the frequency control subsystem 340 interfaces with both the WLAN radio 310 and the WWAN radio 305.

Figure 4:
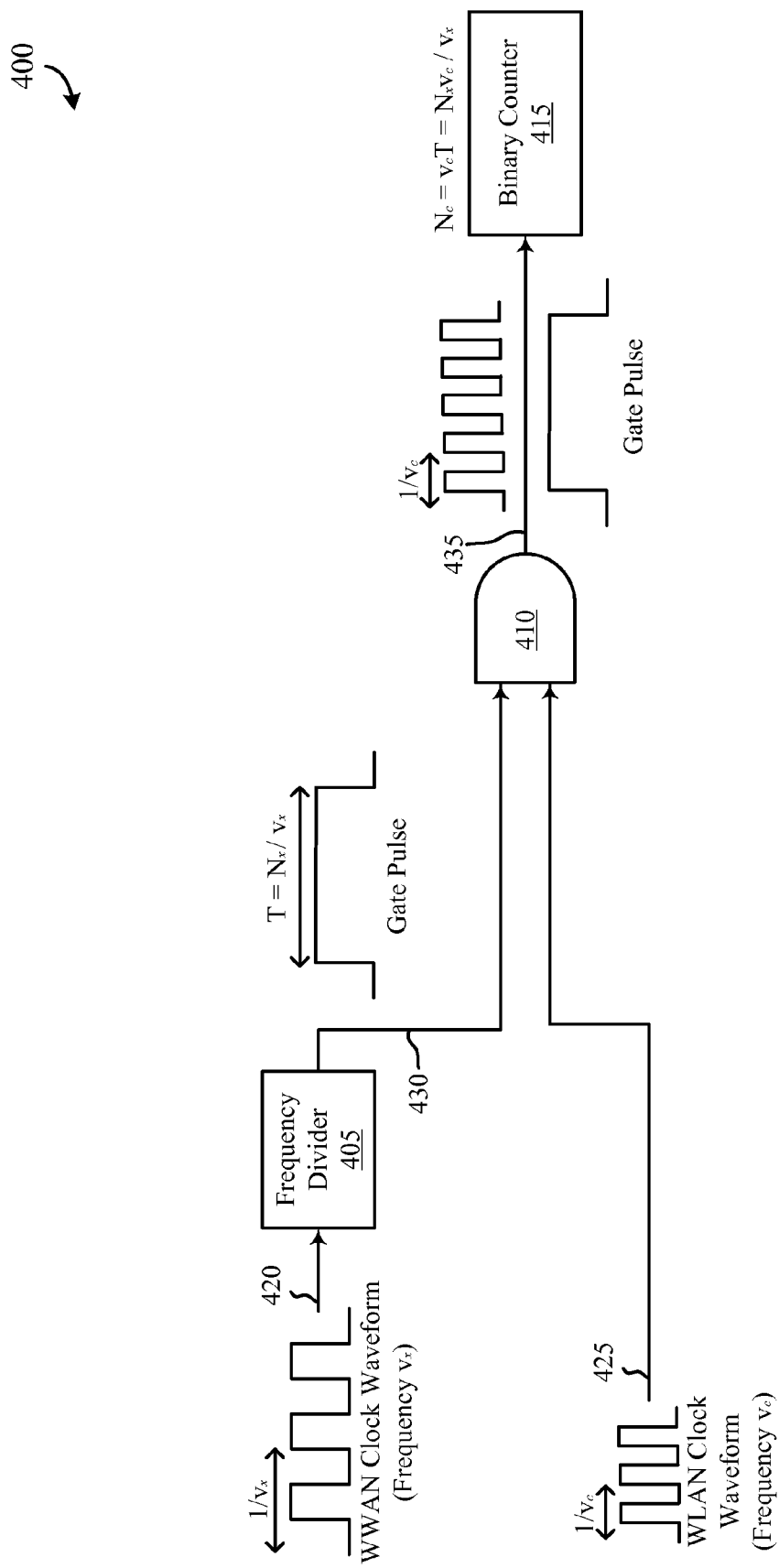
FIG. 4 shows a block diagram of frequency counter operations, in accordance with various aspects of the present disclosure.

FIG. 4 shows a block diagram 400 of frequency counter operations, in accordance with various aspects of the present disclosure. The frequency counter operations may be performed by aspects of the frequency control subsystem 340 described with reference to FIG. 3. A WWAN reference clock may generate a WWAN clock waveform 420 having a frequency $v_x$ and a period of $1/v_x$. A frequency divider 405 may increase the period of the WWAN clock waveform 420 by $N_x$ to generate a gate pulse 430 having a latching interval $T=N_x/v_x$.

A WLAN reference clock may generate a WLAN clock waveform 425 having a frequency $v_c$ and period of $1/v_c$. The WLAN clock waveform 425 and the gate pulse 430 may be compared in a logical AND gate 410. The gate pulse 430 may act as a latch, such that the output 435 of the logical AND gate 410 are the cycles of the WLAN clock waveform 425 that occur during the gate pulse 430. A binary counter 415 may then count the number of cycles $N_c$ of the output 435 (i.e., the number of cycles of the WLAN clock waveform 425 occurring during the gate pulse 430), where $N_c = v_c T = N_x v_c / v_x$.

The measurement time and uncertainty from a single frequency measurement may depend on the cycles counted by the binary counter 415 ($v_c$) as well as the latching interval (T) of the gate pulse 430. For example, if the gate pulse 430 has a latching interval of once per second (T=1 sec) and the WLAN reference clock generates a WLAN clock waveform 425 with a frequency of 480 MHz ($v_c$=480 MHz), then the frequency estimate may be the difference in the latched counts of the 480 MHz WLAN clock waveform 425 and the uncertainty may be one cycle of the WLAN clock waveform 425 counted by the binary counter 415 (e.g., $1/480$ μs), which may produce a frequency error of approximately 2 ppb.

A longer gate pulse 430 may provide a more accurate frequency measurement. However, when the WLAN and WWAN radios are sharing resources, a longer latching period may not be available. Therefore, the frequency counter operations may be performed before or after the WLAN and WWAN radios assist each other. In some examples, this may cause increased latency in fulfilling a request for assistance. This latency may be reduced by adjusting the frequency counter operations.

Figure 5:
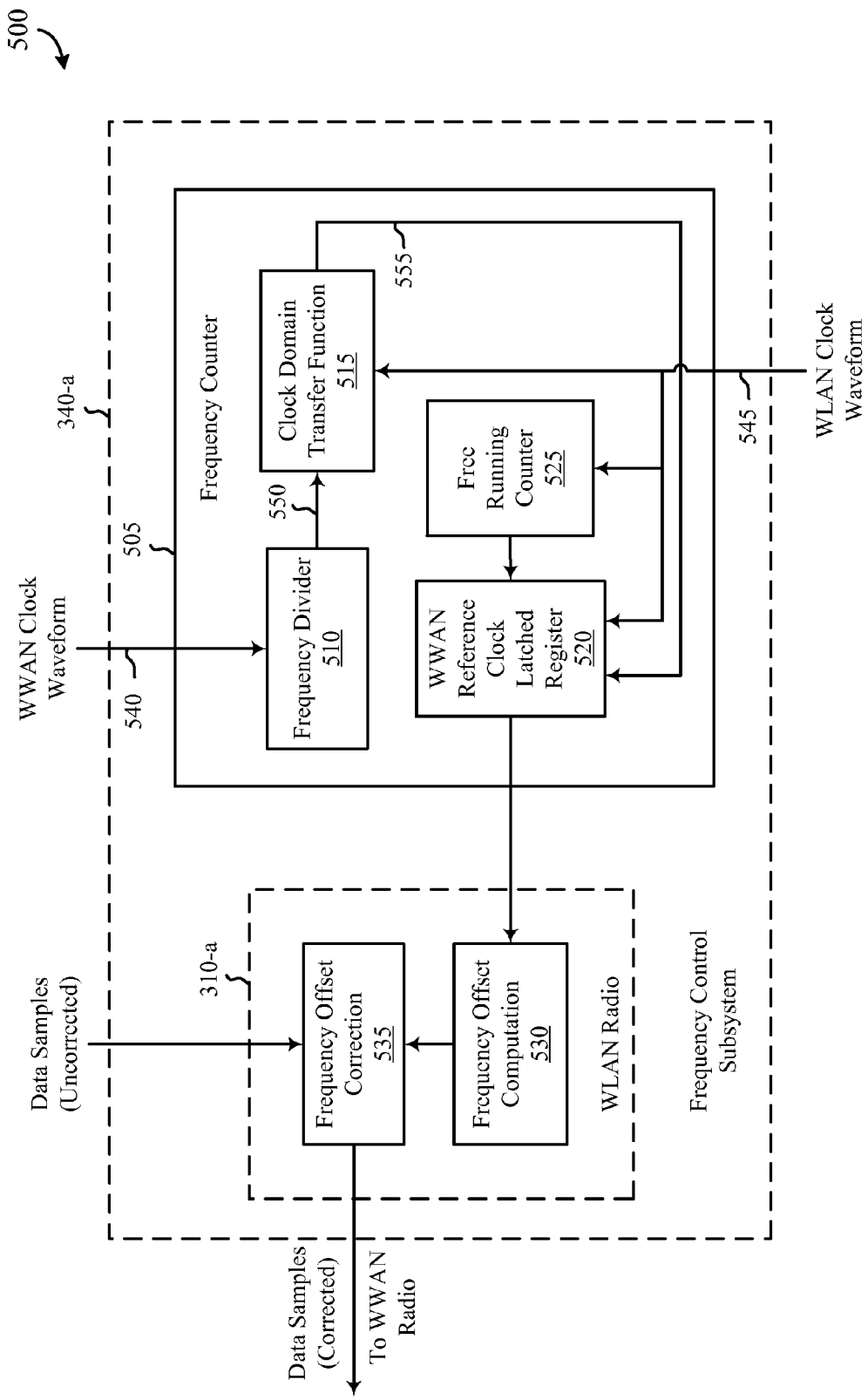
FIG. 5 shows a block diagram of a frequency control subsystem, in accordance with various aspects of the present disclosure.

FIG. 5 shows a block diagram 500 of a frequency control subsystem 340-*a*, in accordance with various aspects of the present disclosure. The frequency control subsystem 340-*a* may be an example of one or more aspects of the frequency control subsystem 340 described with reference to FIG. 3.

The frequency control subsystem 340-*a* may include a frequency counter 505. The frequency counter 505 may perform one or more of the frequency control operations described with reference to FIG. 4. The frequency counter 505 may include a frequency divider 510, a clock domain transfer function 515, a WWAN reference clock latched register 520, and a free running counter 525. The frequency divider 510 may receive a WWAN clock waveform 540 from a WWAN reference clock. The frequency divider 510 may generate a comparison frequency 550 based on the WWAN clock waveform 540 from the WWAN reference clock. The clock domain transfer function 515 may receive the comparison frequency and a WLAN clock waveform 545 from the WLAN reference clock, and may generate a gate pulse 555. The WWAN reference clock latched register 520 may be enabled based on the gate pulse 555 from the clock domain transfer function 515. The WLAN clock waveform 545 from the WLAN reference clock may be used as a clock signal for the WWAN reference clock latched register 520. The WLAN clock waveform 545 from the WLAN reference clock may also be used as a clock signal for the free running counter 525. The free running counter 525 may provide an input for the WWAN reference clock latched register 520. The WWAN reference clock latched register 520 may output the number of cycles of the WLAN reference clock that occur during the gate pulse 555 from the clock domain transfer function 515.

The frequency control subsystem 340-*a* may utilize components of a WLAN radio 310-*a* to perform frequency adjustments. The WLAN radio 310-*a* may be an example of one or more aspects of the WLAN radio 310 described with reference to FIG. 3. The WLAN radio 310-*a* may include a frequency offset computation 530 and a frequency offset correction 535. The frequency offset computation 530 may receive the number of cycles of the WLAN reference clock that occur during the gate pulse, and may determine a frequency offset based on the number. The frequency offset may account for the different frequencies or frequency errors of the WWAN reference clock and the WLAN reference clock. The frequency offset correction 535 may receive the frequency offset from the frequency offset computation 530. The frequency offset correction 535 may use the frequency offset to correct data samples received by the WLAN radio 310-*a* and report the corrected data samples to a WWAN radio (not shown). The data samples may be corrected to compensate for the different frequencies or frequency errors of the WWAN reference clock and the WLAN reference clock.

The data samples may be for inter-frequency search and measurements. When the WLAN radio 310-*a* assists the WWAN radio (not shown) with inter-frequency search and measurements, the data samples for measurements may need to be captured at a specific periodicity (e.g., 6ms sample capture every 40ms). In some examples, the WLAN radio 310-*a* and frequency control subsystem 340-*a* may have little time to initialize before starting the capture of data samples. For example, the WLAN radio 310-*a* and frequency control subsystem 340-*a* may be powered down or in a low power or power saving mode where most of its functionalities are disabled before the request to assist the WWAN radio for inter-frequency search is received. Only a low-power, low-resolution clock may be running on the WLAN radio 310-*a* (in order to maintain basic operation) prior to receipt of the request for assistance. The WWAN reference clock may also not be available to the frequency control subsystem 340-*a* prior to receiving a request for WLAN assistance. The WLAN radio 310-*a* may need to provide the data samples for the inter-frequency search and measurements within a predetermined time due to requirements of the WWAN radio. Therefore, the length of the gate pulse used by the frequency control subsystem 340-*a* may be constrained. Otherwise, additional latency may be introduced when the WLAN radio 310-*a* assists the WWAN radio. This latency may be reduced by adjusting the aspects of the frequency control subsystem 340-*a*.

To address these issues, the frequency control subsystem 340-*a* may be configured to improve the timing of its readiness to apply frequency corrections. For example, the frequency control subsystem 340-*a* may measure the frequency offset of the WLAN and WWAN reference clocks before a request for assistance is issued (to access the assistance mode). Alternatively or in addition, the frequency control subsystem 340-*a* may store the frequency offset counter state during WLAN sleep cycles and load a previously stored frequency offset counter state at WLAN power up. Alternatively or in addition, the frequency control subsystem 340-*a* may dynamically adapt a latching interval used for the frequency offset measurement to reduce the error in the frequency measurement over time. These improvements are illustrated in various timing diagrams included in FIGS. 6-8, described below.

Figure 6:
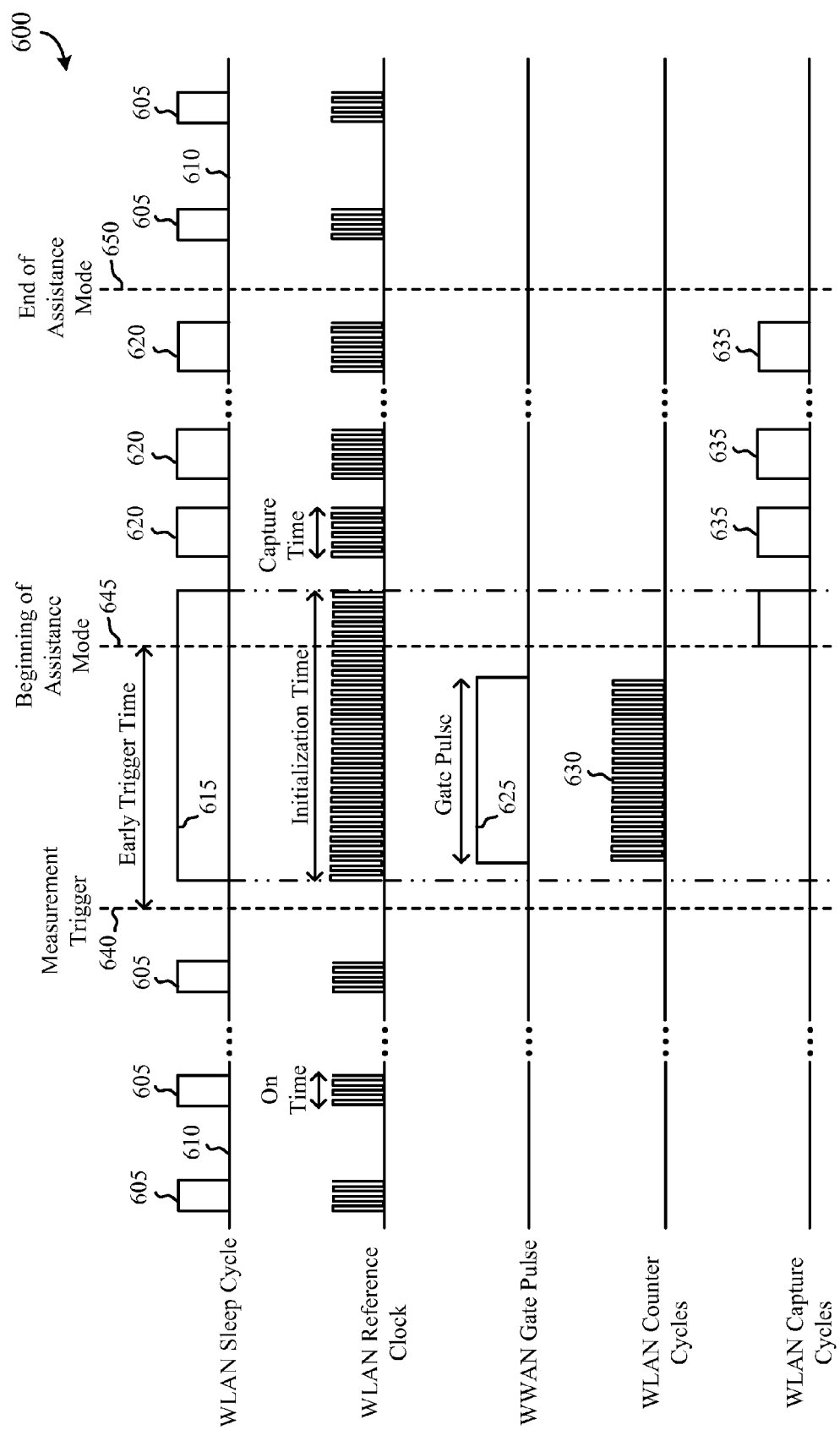
FIG. 6 shows an example of a timing diagram for a UE, in accordance with various aspects of the present disclosure.

FIG. 6 shows an example of a timing diagram 600 for a UE, in accordance with various aspects of the present disclosure. In particular, timing diagram 600 relates to an improved timing that may be used for the correction of different frequencies or frequency errors of the WWAN reference clock and a WLAN reference clock in a UE. Additional, improved timing diagrams will be discussed below with reference to FIGS. 7 and 8. In timing diagram 600, the WLAN reference clock is measured in advance of a WWAN request for WLAN assistance. By measuring the WLAN reference clock prior to the WWAN request for WLAN assistance, the WLAN assistance mode may begin as soon as the request is received, without additional latency due to measurement of the WLAN reference clock.

In timing diagram 600, before an assistance mode between a WLAN radio and a WWAN radio of the UE is triggered, the WLAN radio may have a pre-defined sleep cycle with a short Power ON duration 605 and a long Power OFF duration 610. After the assistance mode between the WLAN radio and the WWAN radio is triggered (at time 640), the WLAN radio may have a large Initial ON duration 615 to allow for counter latching for frequency offset estimation and correction. Subsequent Capture durations 620 after the assistance mode begins (at time 645) may be longer to allow for capturing WWAN data samples using the WLAN radio. The WLAN reference clock may be enabled during the Power On durations 605, the Initial On duration 615, and the Capture durations 620.

In some examples, the frequency offset measurement may be triggered (640) before the assistance mode begins (645). This early trigger time may allow the frequency control subsystem to restore and measure the WLAN reference clock earlier than a WWAN request for WLAN radio assistance. When the assistance mode ends (at time 650), the WLAN sleep cycle may return to the short Power ON durations 605 and a long Power OFF durations 610.

A WWAN gate pulse 625 may be generated after the WLAN reference clock is initialized for frequency measurement. The WWAN gate pulse 625 may be used to latch the WLAN reference clock and generate WLAN counter cycles 630. The number of WLAN counter cycles 630 occurring during the WWAN gate pulse 625 may determine the frequency offset to use when the WLAN radio captures WWAN data samples. The WLAN radio may begin capturing WWAN data samples when the assistance mode begins and the frequency offset has been determined. WLAN capture cycles 635 may correspond to the Capture durations 620 that occur during the assistance mode.

The assistance mode may begin when the WWAN radio sends a request for sample capture to the WLAN radio. In some examples, the WWAN radio may also send the early measurement trigger to the WLAN radio to initiate the frequency control subsystem counter latching procedure before the request for the assistance mode. The early measurement trigger may be based on predictive methods and may include a Layer3 signal based on serving cell measurements (e.g., Reference Signal Received Power or Reference Signal Received Quality) and a threshold or measurement report before actual inter-frequency measurements are configured. Alternatively or in addition, the early measurement trigger may be based on non-predictive methods and may be a periodic trigger with predetermined duty cycle.

In some examples, the early measurement trigger may be predictive based on an estimate of when WLAN assistance may be needed. For example, if the UE is utilizing a carrier aggregation mode, the early measurement trigger may be sent when the WWAN radio receives the carrier aggregation configuration from the network. The early measurement trigger may also be used with multiple SIM applications, where the WLAN radio assists the WWAN radio with GSM communications.

Alternatively, a measurement trigger may be sent with the WLAN assistance request. In this case, the beginning of the Initial ON duration 615 would be used in refining the frequency error. For example, the measurement trigger may be paging for a mobile terminated or a mobile originated call. While sending the measurement trigger at the same time as the request for WLAN assistance may affect the measurement timeline, it guarantees that the frequency offset measurement is required. If the measurement trigger is not sent adequately early, the WLAN assistance mode may be delayed.

Figure 7:
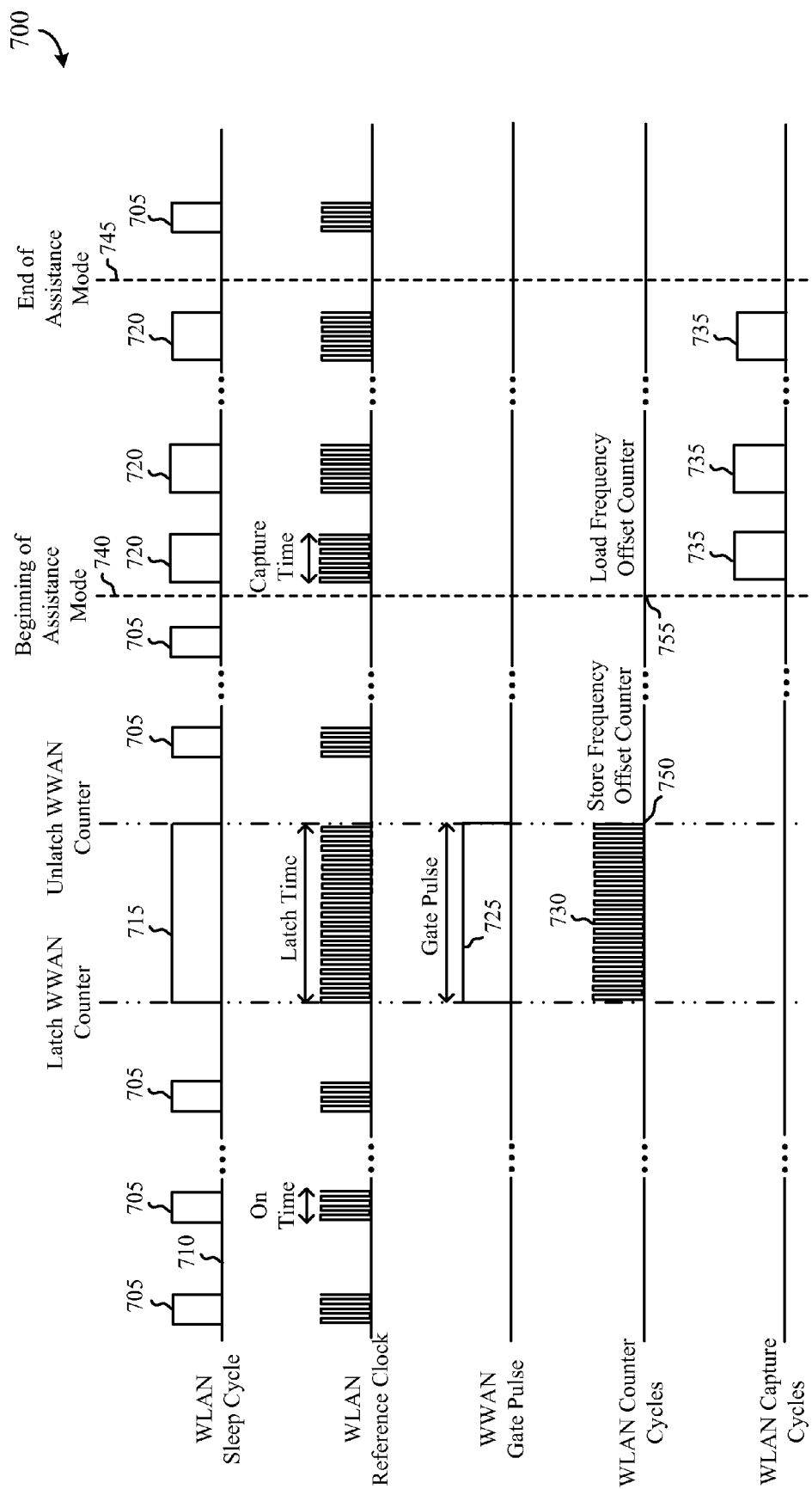
FIG. 7 shows another example of a timing diagram for a UE, in accordance with various aspects of the present disclosure.

FIG. 7 shows another example of a timing diagram 700 for a UE, in accordance with various aspects of the present disclosure. In particular, timing diagram 700 relates to an improved timing that may be used for the correction of different frequencies or frequency errors of the WWAN reference clock and a WLAN reference clock in a UE. The UE may store a frequency offset counter state, and then later load the frequency offset counter state when an assistance mode begins.

In timing diagram 700, before an assistance mode between a WLAN radio and a WWAN radio of the UE begins, the WLAN radio may have a pre-defined sleep cycle with short Power ON duration 705 and a long Power OFF duration 710. Before the assistance mode between the WLAN radio and the WWAN radio begins (at time 740), a large Latch ON duration 715 may be implemented to allow an initial frequency offset to be stored (at time 750). Once the assistance mode begins (at time 740), Capture durations 720 may be longer to allow for capturing WWAN data samples using the WLAN radio. The WLAN reference clock may be enabled during the Power On durations 705, the Latch On duration 715, and the Capture durations 720.

A WWAN gate pulse 725 may be generated during the Latch On duration 715. The WWAN gate pulse 725 may be used to latch the WLAN reference clock and generate initial WLAN counter cycles 730. The number of initial WLAN counter cycles 730 occurring during the WWAN gate pulse 725 may determine an initial frequency offset. At the end of the Latch ON duration 715, the state of the frequency offset counter may be stored (at time 750).

The WLAN radio may begin capturing WWAN data samples when the assistance mode begins (at time 740). WLAN capture cycles 735 may correspond to the Capture durations 720 that occur during the assistance mode. When the assistance mode begins, the previously stored state of the frequency offset counter may be loaded (at time 755), and used for frequency correction of the WWAN data samples captured by the WLAN radio. Thus, the frequency offset measurement may be decoupled from the assistance mode, as the two processes occur asynchronously. When the assistance mode ends (at time 745), the WLAN sleep cycle may return to the short Power ON durations 705.

In some examples, the stored frequency offset counter state may be updated based on a predicted counter value. For example, assuming the WLAN radio sleeps for a duration X, the stored frequency offset counter value may be updated with a predicted counter value to generate an estimate of the counter value at time N. The predicted counter value may be a function of the drift between the WLAN reference clock and the WWAN reference clock.

The drift may be based at least in part on the WLAN cycle. During the Power OFF duration 710, the WLAN reference clock may be gated off, and the stored frequency offset counter state may lose correlation with real time. A low power sleep clock may be calibrated to a divided version of the crystal frequency used for the WLAN reference clock. The low power sleep clock may be used to track the temperature drifts in the frequency offset during the Power OFF durations 710.

By storing the frequency offset counter state, the WLAN assistance mode may begin without a delay to measure the frequency offset between the WLAN reference clock and WWAN reference clock.

Figure 8:
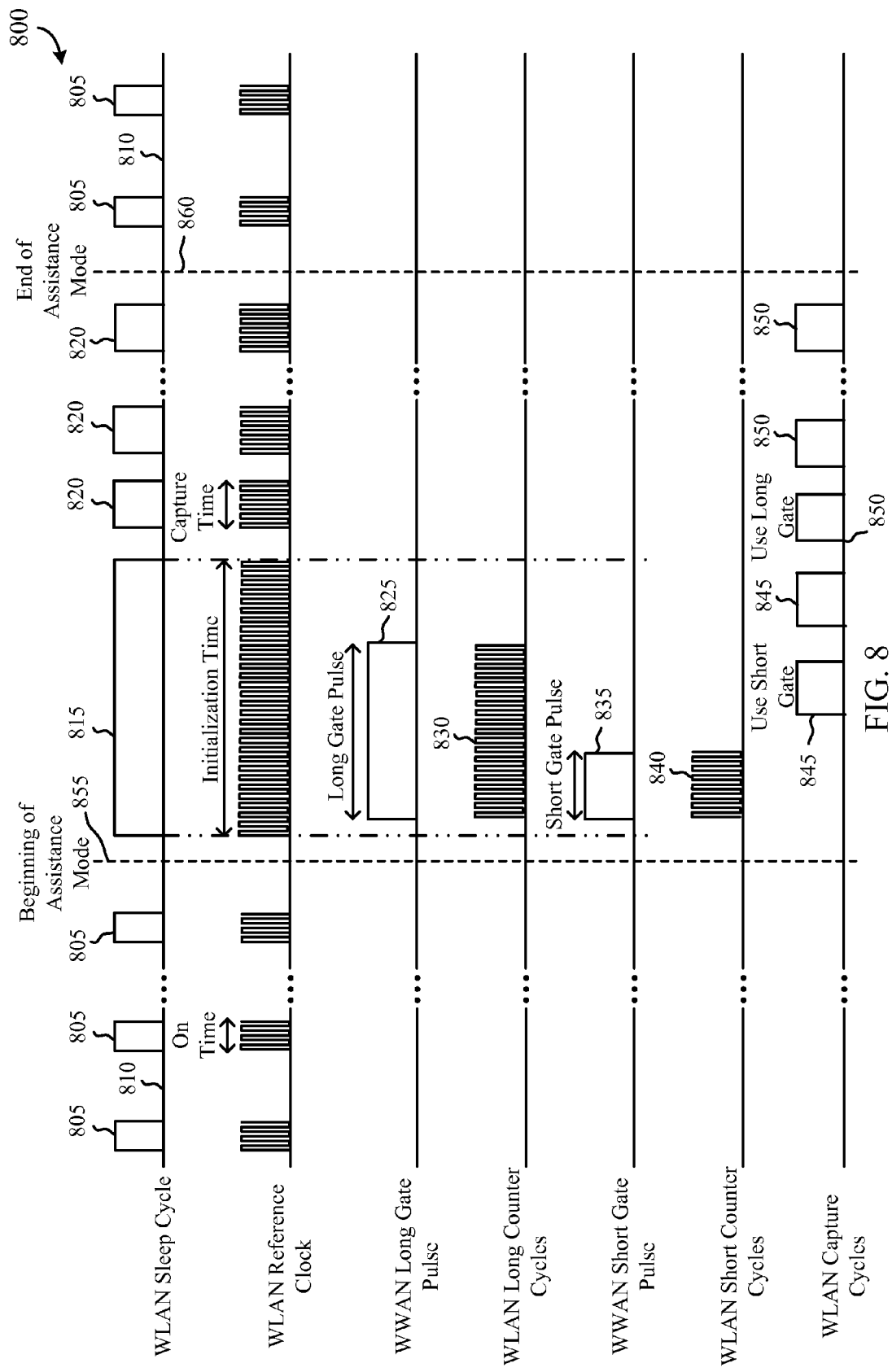
FIG. 8 shows another example of a timing diagram for a UE, in accordance with various aspects of the present disclosure.

FIG. 8 shows another example of a timing diagram 800 for a UE, in accordance with various aspects of the present disclosure. In particular, timing diagram 800 relates to another improved timing that may be used for the correction of different frequencies or frequency errors of the WWAN reference clock and a WLAN reference clock in a UE. The UE may dynamically adapt the duration of the gate pulse used for measuring the frequency offset, which may result in improved accuracy and less latency in the frequency measurements.

Before an assistance mode between a WLAN radio and a WWAN radio of the UE begins, the WLAN radio may have a pre-defined sleep cycle with short Power ON duration 805 and a long Power OFF duration 810. When the assistance mode between the WLAN radio and the WWAN radio begins (at time 855), a large Initial ON duration 815 may be implemented to allow for dynamic counter latching for frequency offset estimation and correction. Subsequent Capture durations 820 may be longer to allow for capturing WWAN data samples using the WLAN radio. The WLAN reference clock may be enabled during the Power On durations 805, the Initial On duration 815, and the Capture durations 820.

A WWAN long gate pulse 825 may be generated after the WLAN reference clock is initialized for frequency measurement. The WWAN long gate pulse 825 may be used to latch the WLAN reference clock and generate WLAN long counter cycles 830. A WWAN short gate pulse 835 may also be generated after the WLAN reference clock is initialized for frequency measurement. The WWAN short gate pulse 835 may also be used to latch the WLAN reference clock and generate WLAN short counter cycles 840.

The UE may use the number of WLAN short counter cycles 840 occurring during the WWAN short gate pulse 835 to determine the frequency offset to use for initial WWAN data samples captured by the WLAN radio. The WLAN radio may begin capturing WWAN data samples after the assistance mode begins and an frequency offset has been determined from the WWAN short gate pulse 835. Initial short WLAN capture cycles 845 may occur while the WLAN long counter cycles are still being generated, and may utilize the WWAN short gate pulse 835 for determining the frequency offset to apply to the data samples. The WWAN short gate pulse 835 may be less accurate than the WWAN long gate pulse 825, but the WWAN short gate pulse 835 may allow the WLAN radio to begin capturing WWAN data samples earlier with the short WLAN capture cycles 845.

As the WLAN reference clock stays ON for a longer duration, the WWAN long gate pulse 825 may generate a more accurate frequency offset to use for subsequent WWAN data samples captured by the WLAN radio during the long WLAN capture cycles 850. The subsequent long WLAN capture cycles 850 may also correspond to the Capture durations 820 that occur during the assistance mode. When the assistance mode ends (at time 860), the WLAN sleep cycle may return to the short Power ON durations 805 and a long Power OFF durations 810.

In some examples, additional frequency offsets may be recorded based on additional WWAN gate pulse durations beyond the long and short gate pulse durations shown in FIG. 8. Additional registers may record the different frequency error estimates generated by the different gate pulse durations. The different frequency error estimates may then be combined. Alternatively, once a frequency error estimate based on a short gate pulse duration is available, the additional registers may be made available for other uses by the UE. By dynamically adjusting the gate pulse durations, the accuracy of the frequency offset measurement and the latency of the assistance mode may adjusted over time, or selected based on the needs of the UE.

Figure 9:
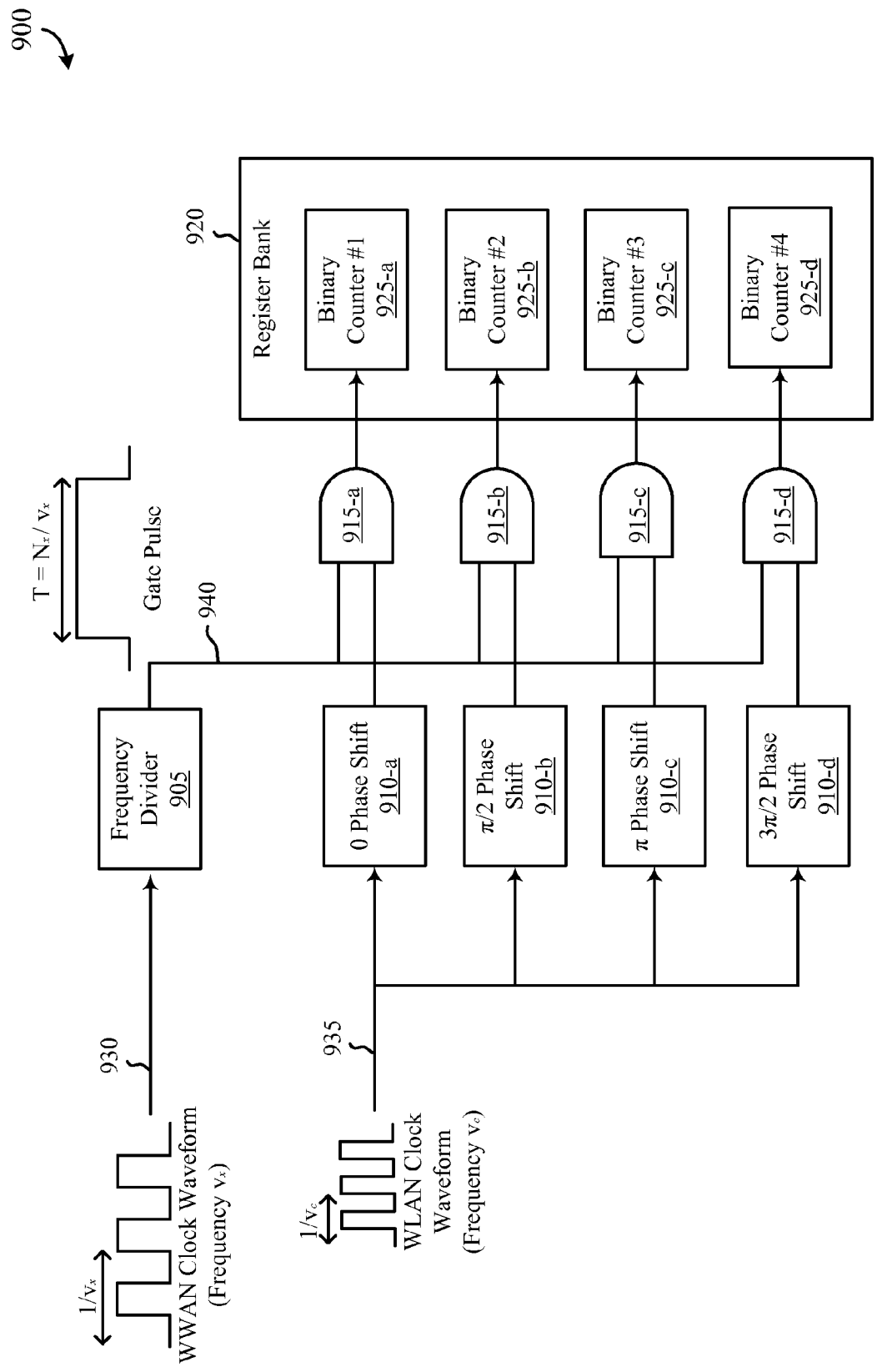
FIG. 9 shows a block diagram of frequency counter operations using multiple registers, in accordance with various aspects of the present disclosure.

FIG. 9 shows a block diagram 900 of frequency counter operations using multiple registers, in accordance with various aspects of the present disclosure. The multiple registers may be combined with phase shifts applied to a WWAN clock waveform to further improve the accuracy of frequency offset measurements. The frequency counter operations may be performed by aspects of the frequency control subsystem 340 described with reference to FIG. 3. A WWAN reference clock may generate a WWAN clock waveform 930 having a frequency $v_x$ and a period of $1/v_x$. A frequency divider 905 may increase the period of the WWAN clock waveform by $N_x$ to generate a gate pulse 940 having a latching interval $T=N_x/v_x$.

A WLAN reference clock may generate a WLAN clock waveform 935 having a frequency $v_c$ and period of $1/v_c$. The phase of the WLAN clock waveform may be shifted by a 0 phase shift 910-*a*, a $\pi/2$ phase shift 910-*b*, a $\pi$ phase shift 910-*c*, and a $3\pi/2$ phase shift 910-*d*. The phase shifts may allow the WLAN clock waveform 935 to be more accurately aligned with the gate pulse 940. In some examples, multiple gate pulse durations may be used as described with reference to FIG. 8.

Each of the phase-shifted WLAN clock waveforms may be compared in logical AND gates 915-*a*, 915-*b*, 915-*c*, and 915-*d* with the gate pulse from the frequency divider 905. The gate pulse may act as a latch for each of the WLAN clock waveforms, such that the output of each logical AND gate 915-*a*, 915-*b*, 915-*c*, and 915-*d* are the cycles of the WLAN clock waveforms that occur during the gate pulse. A register bank 920 may include binary counters 925-*a*, 925-*b*, 925-*c*, and 925-*d* for counting the number of cycles of each of the WLAN clock waveforms occurring during the gate pulse. With N binary counters (corresponding to phase shifts of $\pi n/N$), the effective resolution of the register bank may be improved by a factor of N.

When the Initial On duration begins (as shown in FIG. 8), all registers may be triggered to get a full resolution. Once a target accuracy has been achieved, the number of active registers may be reduced. The inactive registers may be assigned to other tasks for the WLAN radio.

The WWAN reference clock and the WLAN reference clock may each be associated with an oscillator crystal. The oscillator crystal may provide the basis for the reference clock frequency. Oscillator crystals may be manufactured with certain tolerances. For example, the resonant frequency of an oscillator crystal may change based on the crystal's cut, age, and temperature. The cut of an oscillator crystal may have a significant impact of the frequency error of the crystal.

The frequency offset between the WWAN reference clock and the WLAN reference clock may be based in part on the difference in cut between the oscillator crystals associated with each reference clock. A cut-based frequency offset may be measured under a controlled environment at constant temperature and stored in a non-volatile storage of the UE. The cut-based frequency offset may then be used as an initial frequency offset. The cut-based frequency offset may decrease the overall time for the UE to determine the frequency offset between the WWAN reference clock and the WLAN reference clock.

Figure 10:
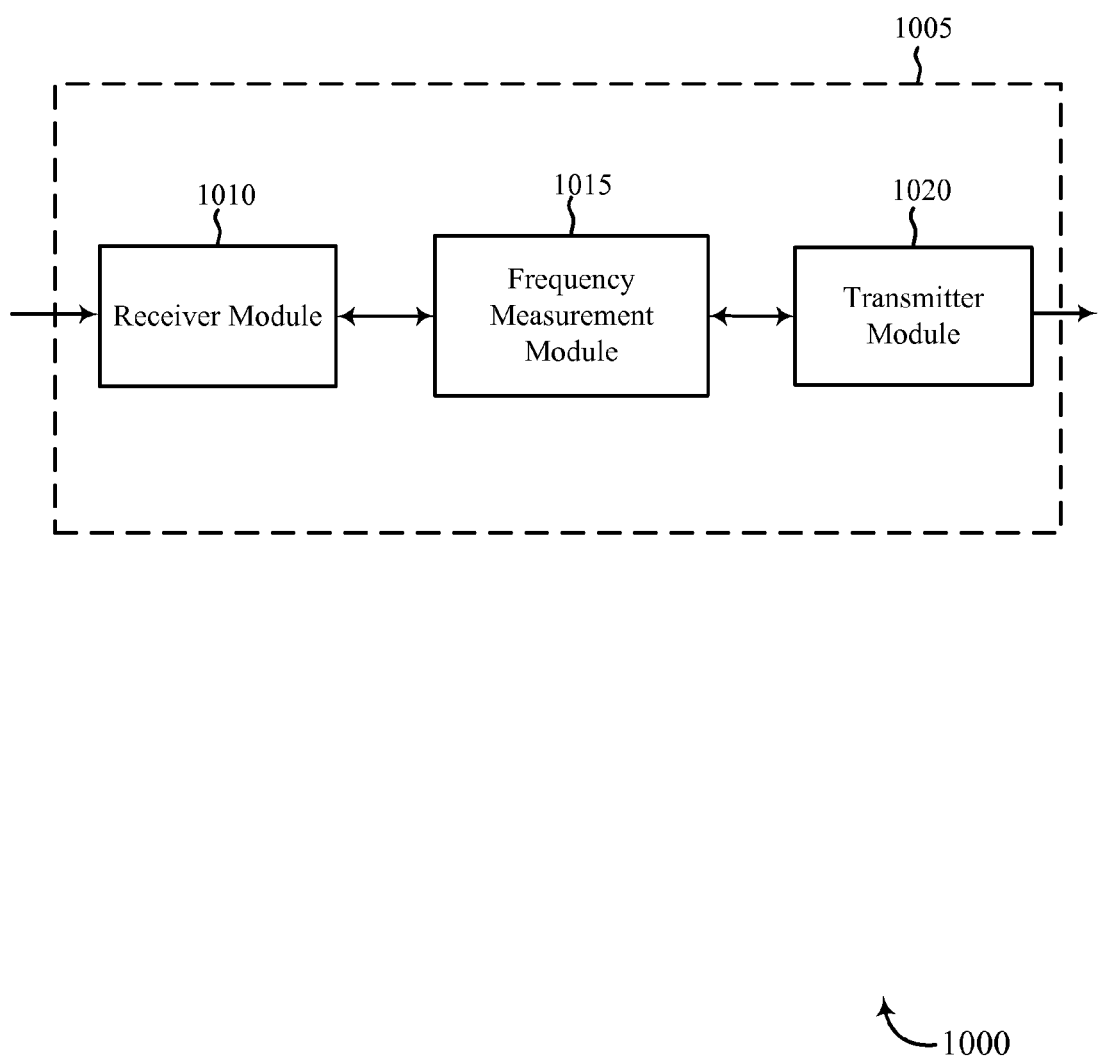
FIG. 10 shows a block diagram of a device for use in wireless communication, in accordance with various aspects of the present disclosure.

FIG. 10 shows a block diagram 1000 of a device 1005 for use in wireless communication, in accordance with various aspects of the present disclosure. The device 1005 may be an example of one or more aspects of a UE 115 described with reference to FIG. 1, 2, or 3. The device 1005 may include a receiver module 1010, a frequency measurement module 1015, and a transmitter module 1020. The device 1005 may also be or include a processor (not shown). Each of these modules may be in communication with each other.

The components of the device 1005 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each module may also be implemented, in whole or in part, with instructions embodied in a memory, formatted to be executed by one or more general or application-specific processors.

The receiver module 1010 may receive information such as packets, user data, and/or control information associated with various information channels (e.g., control channels, data channels, etc.). The receiver module 1010 may be configured to receive both WLAN communications (such as Wi-Fi communications) as well as WWAN communications (such as LTE or GSM communications). The receiver module 1010 may use components for receiving WLAN communications to assist with WWAN communications.

The frequency measurement module 1015 may determine a frequency offset between two reference clocks. The frequency offset may be used by the receiver module 1010 or the transmitter module 1020 to compensate for different frequencies or frequency errors between the two reference clocks. In some examples, the frequency measurement module 1015 may be collocated with the receiver module 1010 and the transmitter module 1020 in a transceiver module.

The transmitter module 1020 may transmit information such as packets, user data, and/or control information associated with various information channels (e.g., control channels, data channels, etc.). The transmitter module 1020 may be configured to transmit both WLAN communications (such as Wi-Fi communications) as well as WWAN communications (such as LTE or GSM communications). The transmitter module 1020 may use components for transmitting WLAN communications to assist with WWAN communications. In some examples, the transmitter module 1020 may be collocated with the receiver module 1010 and the frequency measurement module 1015 in a transceiver module.

Figure 11:
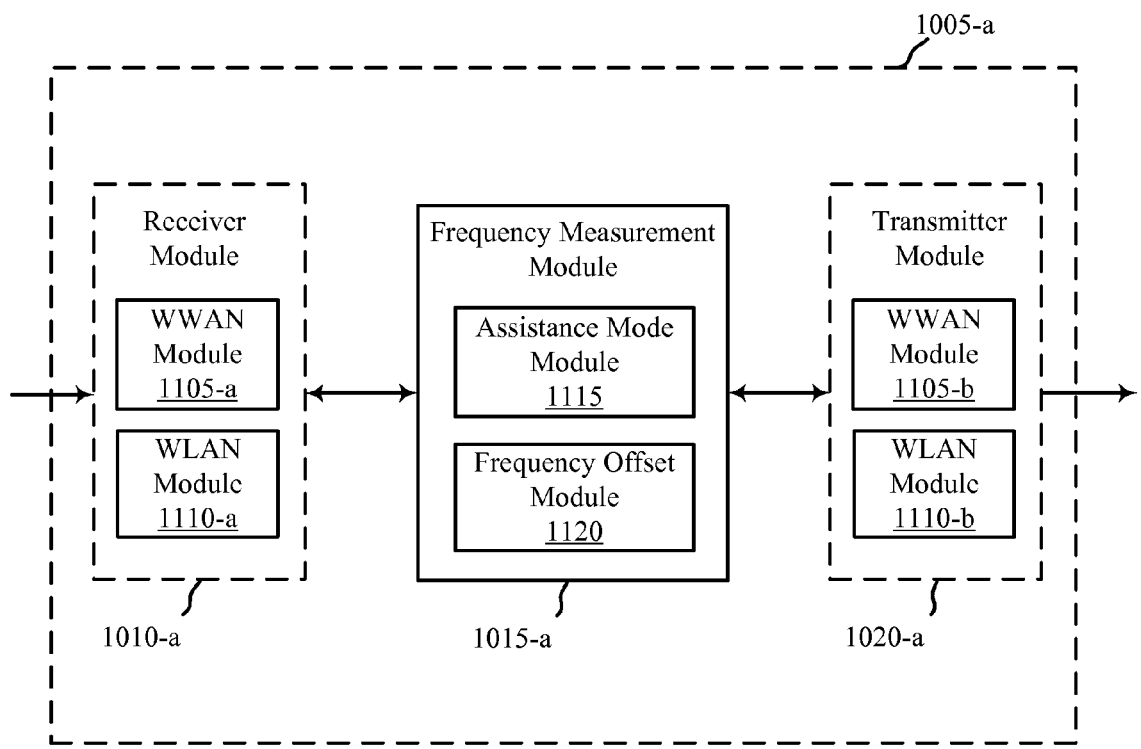
FIG. 11 shows a block diagram of a device for use in wireless communication, in accordance with various examples.

FIG. 11 shows a block diagram 1100 of a device 1005-*a* for use in wireless communication, in accordance with various examples. The device 1005-*a* may be an example of one or more aspects of a UE 115 described with reference to FIG. 1, 2 or 3. The device 1005-*a* may also be an example of a device 1005 described with reference to FIG. 10. The device 1005-*a* may include a receiver module 1010-*a*, a frequency measurement module 1015-*a*, and a transmitter module 1020-*a*, which may be examples of the corresponding modules of device 1005. The device 1005-*a* may also include a processor (not shown). Each of these components may be in communication with each other.

The receiver module 1010-*a* may include a WWAN module 1105-*a* and a WLAN module 1110-*a*. The WWAN module 1105-*a* may be used for WWAN communications. The WLAN module 1110-*a* may be used for WLAN communications, and may assist the WWAN module 1105-*a* with WWAN communications.

The frequency measurement module 1015-*a* may include an assistance mode module 1115 and a frequency offset module 1120. The assistance mode module 1115 may identify one or more trigger factors associated with an assistance mode. The assistance mode may include the WLAN module 1110 assisting the WWAN module 1105. The frequency offset module 1120 may measure a frequency offset between a WWAN reference clock of the WWAN module 1105 and a WLAN reference clock of the WLAN module 1110 based at least in part on the one or more trigger factors from the assistance mode module 1115. The frequency offset module 1120 may store the frequency offset for use by the WLAN module 1110 or the WWAN module 1105 when in an assistance mode.

The transmitter module 1020-*a* may be collocated with the receiver module 1010-*a* and may also include a WWAN module 1105-*b* and a WLAN module 1110-*b*. The WWAN module 1105-*b* may be used for WWAN communications. The WLAN module 1110-*b* may be used for WLAN communications, and may assist the WWAN module 1105-*b* with WWAN communications.

Figure 12:
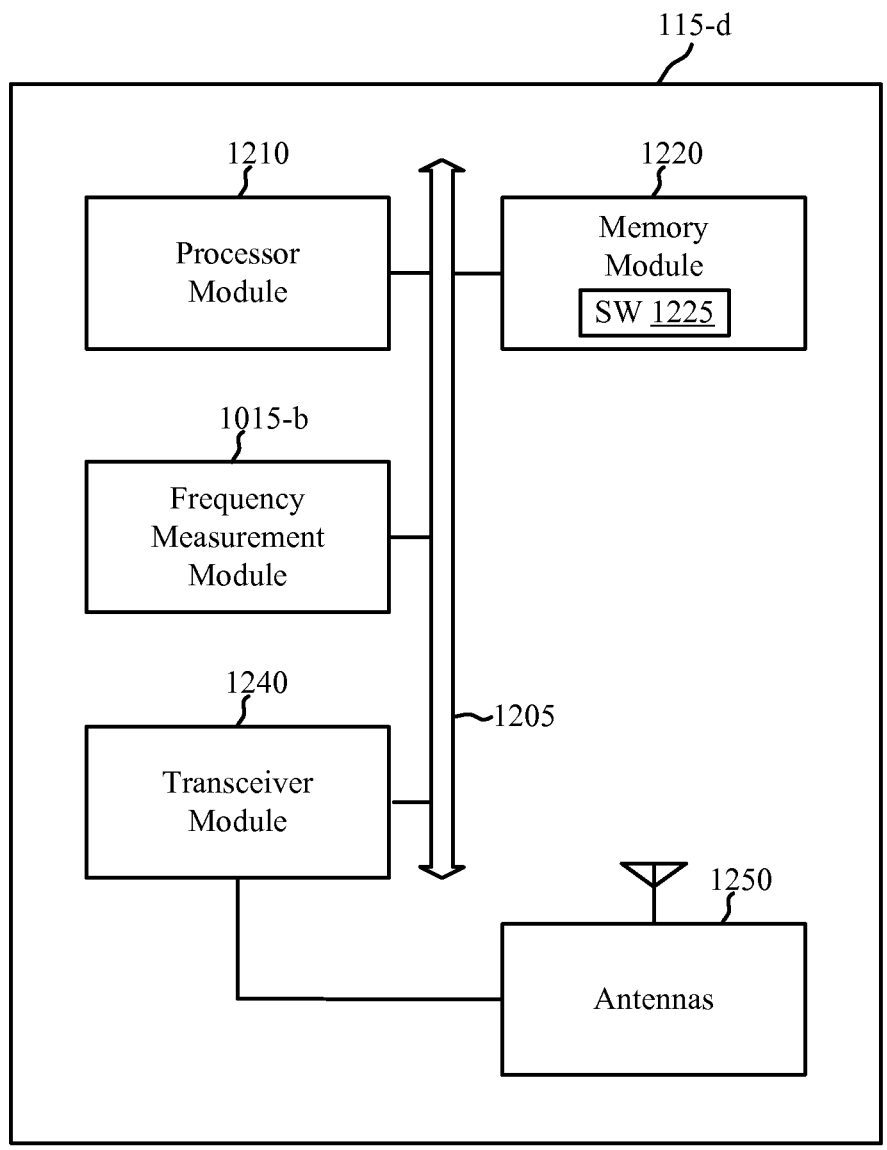
FIG. 12 shows a system for use in wireless communication, in accordance with various examples.

FIG. 12 shows a system 1200 for use in wireless communication, in accordance with various examples. System 1200 may include a UE 115-d, which may be an example of the UEs 115 of FIG. 1, 2, or 3. UE 115-d may also be an example of one or more aspects of devices 1005 of FIG. 10 or 11.

The UE 115-*d* may generally include components for bi-directional voice and data communications including components for transmitting communications and components for receiving communications. The UE 115-*d* may include antennas 1250, a transceiver module 1240, a processor module 1210, and memory 1220 (including software (SW) 1225), which each may communicate, directly or indirectly, with each other (e.g., via one or more buses 1205). The transceiver module 1240 may be configured to communicate bi-directionally, via the antennas 1250 or one or more wired or wireless links, with one or more networks, as described above. For example, the transceiver module 1240 may be configured to communicate bi-directionally with base stations 105 and with the access points 110 with reference to FIG. 1 or 2. The transceiver module 1240 may include a WWAN radio and a WLAN radio configured to modulate the packets and provide the modulated packets to the antennas 1250 for transmission, and to demodulate packets received from the antennas 1250.

The UE 115-*d* may have multiple antennas 1250 capable of concurrently transmitting or receiving multiple wireless communications. The transceiver module 1240 may be capable of concurrently communicating with one or more base stations 105 via multiple component carriers and/or communications networks. The transceiver module 1240 may also be capable of communicating with one or more access points 110 via the antennas 1250. The transceiver module 1240 may use a components in the WLAN radio to process WWAN communications received over the antennas 1250. The transceiver module 1240 may also use components in the WLAN radio to process WWAN communications prior to transmission over the antennas 1250.

The UE 115-d may include a frequency measurement module 1015-b, which may perform the functions described above for the frequency measurement module 1015 of device 1005 of FIG. 10 or 11 or of UE 115 of FIG. 1, 2, or 3. The frequency measurement module 1015-*b* may determine a frequency offset between two reference clocks of the transceiver module 1240. The frequency offset may be used by the transceiver module 1240 to compensate for different frequencies or frequency errors between the two reference clocks. In some examples, the frequency measurement module 1015-*b* may be collocated with the transceiver module 1240.

The memory 1220 may include random access memory (RAM) and read-only memory (ROM). The memory 1220 may store computer-readable, computer-executable software/firmware code 1225 containing instructions that are configured to, when executed, cause the processor module 1210 to perform various functions described herein (e.g., measure a frequency offset, correct data samples, etc.). Alternatively, the computer-readable, computer-executable software/firmware code 1225 may not be directly executable by the processor module 1210 but be configured to cause a computer (e.g., when compiled and executed) to perform functions described herein. The processor module 1210 may include an intelligent hardware device, e.g., a central processing unit (CPU), a microcontroller, an application-specific integrated circuit (ASIC), etc.

Figure 13:
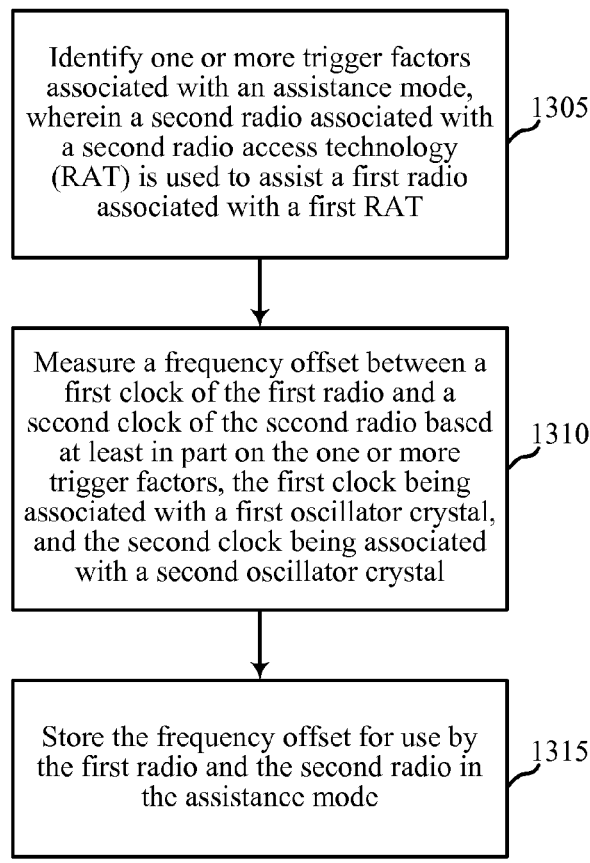
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115 described with reference to FIG. 1, 2, 3, or 12, or aspects of one or more of the devices 1005 described with reference to FIG. 10 or 11. In some examples, a UE may execute one or more sets of codes to control the functional elements of the UE to perform the functions described below. Additionally or alternatively, UE may perform one or more of the functions described below using-purpose hardware.

At block 1305, the method 1300 may include identifying one or more trigger factors associated with an assistance mode, wherein a second radio associated with a second RAT is used to assist a first radio associated with a first RAT. The first RAT may include WWAN technology and the second RAT may include WLAN technology.

The operations at block 1305 may be performed using the frequency measurement module 1015 described with reference to FIGS. 10-12.

At block 1310, the method 1300 may include measuring a frequency offset between a first clock of the first radio and a second clock of the second radio based at least in part on the one or more trigger factors, the first clock being associated with a first oscillator crystal, and the second clock being associated with a second oscillator crystal. The one or more trigger factors may include a length of a sleep cycle for the first radio or the second radio, and the measurement of the frequency offset may be performed periodically based at least in part on the length of the sleep cycle.

In some examples, a first frequency error of the first oscillator crystal and a second frequency error of the second oscillator crystal may be measured. The first frequency error of the first oscillator crystal and the second frequency error of the second oscillator crystal may be measured in a controlled environment at a constant temperature. An initial frequency offset may be determined based at least in part on the first frequency error and the second frequency error, and the initial frequency offset may be stored. The frequency offset between the first clock and the second clock may then be based at least in part on the stored initial frequency offset.

The operations at block 1310 may be performed using the frequency measurement module 1015 described with reference to FIGS. 10-12.

At block 1315, the method 1300 may include storing the frequency offset for use by the first radio and the second radio in the assistance mode. The assistance mode may be initiated based at least in part on the one or more trigger factors. Initiating the assistance mode may include sending, from the first radio to the second radio, a request for assistance.

The stored frequency offset may be used to correct collected samples while the first and second radios are in the assistance mode.

In some examples, the second radio may collect samples for the first radio while in the assistance mode. The second radio may then adjust the collected samples based at least in part on the frequency offset.

The operations at block 1315 may be performed using the frequency measurement module 1015 described with reference to FIGS. 10-12.

Thus, the method 1300 may provide for wireless communication. It should be noted that the method 1300 is just one implementation and that the operations of the method 1300 may be rearranged or otherwise modified such that other implementations are possible.

Figure 14:
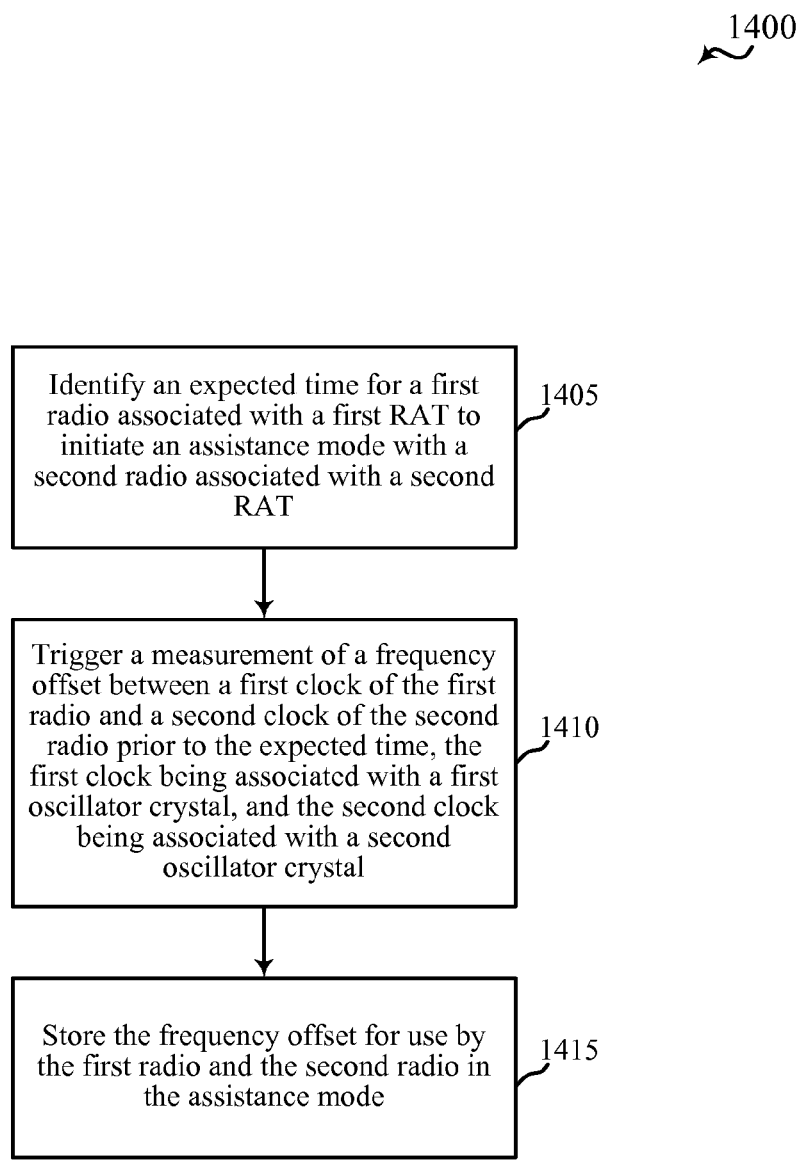
FIG. 14 is a flow chart illustrating another example of a method for wireless communication, in accordance with various aspects of the present disclosure.

FIG. 14 is a flow chart illustrating another example of a method 1400 for wireless communication, in accordance with various aspects of the present disclosure. For clarity, the method 1400 is described below with reference to aspects of one or more of the UEs 115 described with reference to FIG. 1, 2, 3, or 12, or aspects of one or more of the devices 1005 described with reference to FIG. 10 or 11. In some examples, a UE may execute one or more sets of codes to control the functional elements of the UE to perform the functions described below. Additionally or alternatively, UE may perform one or more of the functions described below using-purpose hardware.

At block 1405, the method 1400 may include identifying an expected time for a first radio associated with a first RAT to initiate an assistance mode with a second radio associated with a second RAT.

The operations at block 1405 may be performed using the frequency measurement module 1015 described with reference to FIGS. 10-12.

At block 1410, the method 1400 may include triggering a measurement of a frequency offset between a first clock of the first radio and a second clock of the second radio prior to the expected time, the first clock being associated with a first oscillator crystal, and the second clock being associated with a second oscillator crystal. In some examples, the expected time may be determined based at least in part on signal strength measurements for one or more target frequencies of a carrier aggregation mode. In other examples, the expected time may be determined based at least in part on a received page for a SIM in a multiple active SIM mode. In other examples, the expected time may be determined based at least in part on serving cell measurements. The serving cell measurements may indicate that the UE is moving away from the serving cell.

The operations at block 1410 may be performed using the frequency measurement module 1015 described with reference to FIGS. 10-12.

At block 1415, the method 1400 may include storing the frequency offset for use by the first radio and the second radio in the assistance mode. The stored frequency offset may be used to correct collected samples while the first and second radios are in the assistance mode. The operations at block 1415 may be performed using the frequency measurement module 1015 described with reference to FIGS. 10-12.

Thus, the method 1400 may provide for wireless communication. It should be noted that the method 1400 is just one implementation and that the operations of the method 1400 may be rearranged or otherwise modified such that other implementations are possible.

Figure 15:
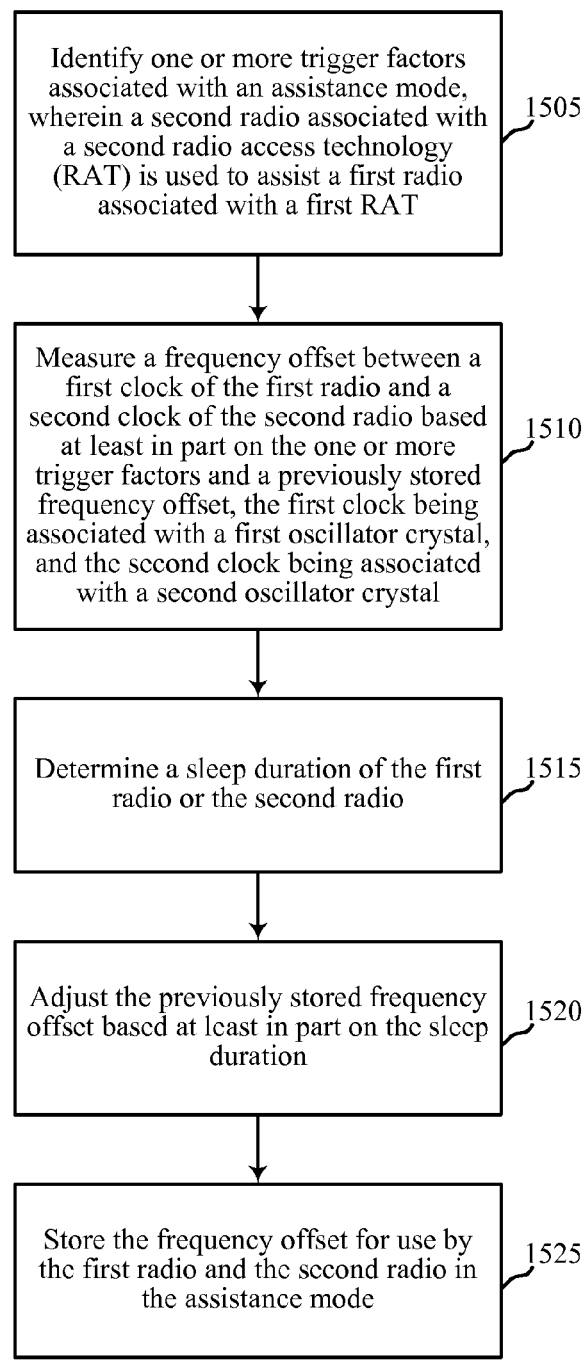
FIG. 15 is a flow chart illustrating yet another example of a method for wireless communication, in accordance with various aspects of the present disclosure.

FIG. 15 is a flow chart illustrating yet another example of a method 1500 for wireless communication, in accordance with various aspects of the present disclosure. For clarity, the method 1500 is described below with reference to aspects of one or more of the UEs 115 described with reference to FIG. 1, 2, 3, or 12, or aspects of one or more of the devices 1005 described with reference to FIG. 10 or 11. In some examples, a UE may execute one or more sets of codes to control the functional elements of the UE to perform the functions described below. Additionally or alternatively, UE may perform one or more of the functions described below using-purpose hardware.

At block 1505, the method 1500 may include identifying one or more trigger factors associated with an assistance mode wherein a second radio associated with a second RAT is used to assist a first radio associated with a first RAT.

The operations at block 1505 may be performed using the frequency measurement module 1015 described with reference to FIGS. 10-12.

At block 1510, the method 1500 may include measuring a frequency offset between a first clock of the first radio and a second clock of the second radio based at least in part on the one or more trigger factors and a previously stored frequency offset, the first clock being associated with a first oscillator crystal, and the second clock being associated with a second oscillator crystal.

The operations at block 1510 may be performed using the frequency measurement module 1015 described with reference to FIGS. 10-12.

At block 1515, the method 1500 may include determining a sleep duration of the first radio or the second radio. The operations at block 1515 may be performed using the frequency measurement module 1015 described with reference to FIGS. 10-12.

At block 1520, the method 1500 may include adjusting the previously stored frequency offset based at least in part on the sleep duration. The operations at block 1520 may be performed using the frequency measurement module 1015 described with reference to FIGS. 10-12.

At block 1525, the method 1500 may include storing the frequency offset for use by the first radio and the second radio in the assistance mode. The stored frequency offset may be used to correct collected samples while the first and second radios are in the assistance mode. The operations at block 1525 may be performed using the frequency measurement module 1015 described with reference to FIGS. 10-12.

Thus, the method 1500 may provide for wireless communication. It should be noted that the method 1500 is just one implementation and that the operations of the method 1500 may be rearranged or otherwise modified such that other implementations are possible.

Figure 16:
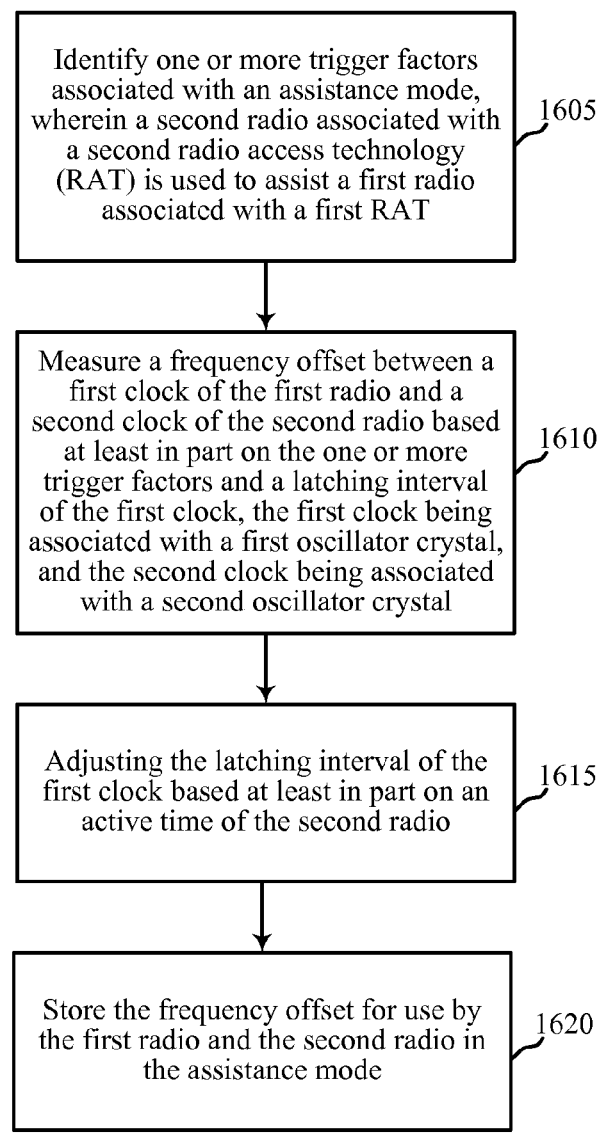
FIG. 16 is a flow chart illustrating still another example of a method for wireless communication, in accordance with various aspects of the present disclosure.

FIG. 16 is a flow chart illustrating still another example of a method 1600 for wireless communication, in accordance with various aspects of the present disclosure. For clarity, the method 1600 is described below with reference to aspects of one or more of the UEs 115 described with reference to FIG. 1, 2, 3, or 12, or aspects of one or more of the devices 1005 described with reference to FIG. 10 or 11. In some examples, a UE may execute one or more sets of codes to control the functional elements of the UE to perform the functions described below. Additionally or alternatively, UE may perform one or more of the functions described below using-purpose hardware.

At block 1605, the method 1600 may include identifying one or more trigger factors associated with an assistance mode wherein a second radio associated with a second RAT is used to assist a first radio associated with a first RAT.

The operations at block 1605 may be performed using the frequency measurement module 1015 described with reference to FIGS. 10-12.

At block 1610, the method 1600 may include measuring a frequency offset between a first clock of the first radio and a second clock of the second radio based at least in part on the one or more trigger factors and a latching interval of the first clock, the first clock being associated with a first oscillator crystal, and the second clock being associated with a second oscillator crystal. A number of cycles of the second clock occurring during the latching interval of the first clock may then be counted.

The operations at block 1610 may be performed using the frequency measurement module 1015 described with reference to FIGS. 10-12.

At block 1615, the method 1600 may include adjusting the latching interval of the first clock based at least in part on an active time of the second radio. In some examples, the latching interval of the first clock may be decreased based at least in part on a low active time of the second radio. In some examples, the latching interval of the first clock may be increased based at least in part on a high active time of the second radio.

The operations at block 1615 may be performed using the frequency measurement module 1015 described with reference to FIGS. 10-12.

At block 1620, the method 1600 may include storing the frequency offset for use by the first radio and the second radio in the assistance mode. The stored frequency offset may be used to correct collected samples while the first and second radios are in the assistance mode. The operations at block 1620 may be performed using the frequency measurement module 1015 described with reference to FIGS. 10-12.

Thus, the method 1600 may provide for wireless communication. It should be noted that the method 1600 is just one implementation and that the operations of the method 1600 may be rearranged or otherwise modified such that other implementations are possible.

In some examples, aspects from two or more of the methods 1300, 1400, 1500, or 1600 may be combined. It should be noted that the methods 1300, 1400, 1500, and 1600 are just example implementations, and that the operations of the methods 1300, 1400, 1500, and 1600 may be rearranged or otherwise modified such that other implementations are possible.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, flash memory, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

What is claimed is:

1. A method for wireless communications by a user equipment (UE), comprising:
   identifying one or more trigger factors associated with an assistance mode, wherein a second radio associated with a second radio access technology (RAT) is used to assist a first radio associated with a first RAT;
   measuring a frequency offset between a first clock of the first radio and a second clock of the second radio based at least in part on the one or more trigger factors, the first clock being associated with a first oscillator crystal, and the second clock being associated with a second oscillator crystal; and
   storing the frequency offset for use by the first radio and the second radio in the assistance mode.

2. The method of claim 1, further comprising:
   initiating the assistance mode of the first radio and the second radio based at least in part on the one or more trigger factors.

3. The method of claim 2, wherein initiating the assistance mode comprises:
   sending, from the first radio to the second radio, a request for assistance.

4. The method of claim 1, wherein the first RAT comprises wireless wide area network (WWAN) technology and the second RAT comprises wireless local area network (WLAN) technology.

5. The method of claim 1, wherein the one or more trigger factors comprises a length of a sleep cycle for the first radio or the second radio, the method further comprising:
   triggering the measurement of the frequency offset periodically based at least in part on the length of the sleep cycle.

6. The method of claim 1, wherein the one or more trigger factors comprises an expected time for the first radio to initiate the assistance mode with the second radio, the method further comprising:
   triggering the measurement of the frequency offset prior to the expected time.

7. The method of claim 6, further comprising:
   determining the expected time based at least in part on signal strength measurements for one or more target frequencies of a carrier aggregation mode.

8. The method of claim 6, further comprising:
   determining the expected time based at least in part on a received page for a subscriber identity module (SIM) in a multiple active SIM mode.

9. The method of claim 6, further comprising:
   determining the expected time based at least in part on serving cell measurements.

10. The method of claim 9, wherein the serving cell measurements indicate the UE is moving away from the serving cell.

11. The method of claim 1, further comprising:
    measuring the frequency offset between the first clock and the second clock based at least in part on a previously stored frequency offset.

12. The method of claim 11, wherein measuring the frequency offset further comprises:
    determining a sleep duration of the first radio or the second radio; and
    adjusting the previously stored frequency offset based at least in part on the sleep duration.

13. The method of claim 1, further comprising:
    measuring the frequency offset between the first clock and the second clock based at least in part on a latching interval of the first clock.

14. The method of claim 13, further comprising:
    counting a number of cycles of the second clock occurring during the latching interval of the first clock.

15. The method of claim 13, further comprising:
    adjusting the latching interval of the first clock based at least in part on an active time of the second radio.

16. The method of claim 15, further comprising:
    decreasing the latching interval of the first clock based at least in part on a low active time of the second radio.

17. The method of claim 15, further comprising:
    increasing the latching interval of the first clock based at least in part on a high active time of the second radio.

18. The method of claim 1, further comprising:
    measuring a first frequency error of the first oscillator crystal;
    measuring a second frequency error of the second oscillator crystal;
    determining an initial frequency offset based at least in part on the first frequency error and the second frequency error; and
    storing the initial frequency offset, wherein the frequency offset between the first clock and the second clock is based at least in part on the stored initial frequency offset.

19. The method of claim 18, further comprising:
    measuring the first frequency error of the first oscillator crystal and the second frequency error of the second oscillator crystal in a controlled environment at a constant temperature.

20. The method of claim 1, further comprising:
collecting samples by the second radio in the assistance mode; and
adjusting the collected samples based at least in part on the frequency offset.

21. An apparatus for wireless communication, comprising:
means for identifying one or more trigger factors associated with an assistance mode, wherein a second radio associated with a second radio access technology (RAT) is used to assist a first radio associated with a first RAT;
means for measuring a frequency offset between a first clock of the first radio and a second clock of the second radio based at least in part on the one or more trigger factors, the first clock being associated with a first oscillator crystal, and the second clock being associated with a second oscillator crystal; and
means for storing the frequency offset for use by the first radio and the second radio in the assistance mode.

22. The apparatus of claim 21, wherein the one or more trigger factors comprises an expected time for the first radio to initiate the assistance mode with the second radio, the apparatus further comprising:
means for triggering the measurement of the frequency offset prior to the expected time.

23. The apparatus of claim 21, further comprising:
means for measuring the frequency offset between the first clock and the second clock based at least in part on a previously stored frequency offset.

24. The apparatus of claim 23, wherein the means for measuring the frequency offset further comprises:
means for determining a sleep duration of the first radio or the second radio; and
means for adjusting the previously stored frequency offset based at least in part on the sleep duration.

25. The apparatus of claim 21, further comprising:
means for measuring the frequency offset between the first clock and the second clock based at least in part on a latching interval of the first clock.

26. The apparatus of claim 25, further comprising:
means for adjusting the latching interval of the first clock based at least in part on an active time of the second radio.

27. An apparatus for wireless communication, comprising:
a processor;
memory in electronic communication with the processor; and
instructions stored in the memory, the instructions being executable by the processor to:
identify one or more trigger factors associated with an assistance mode, wherein a second radio associated with a second radio access technology (RAT) is used to assist a first radio associated with a first RAT;
measure a frequency offset between a first clock of the first radio and a second clock of the second radio based at least in part on the one or more trigger factors, the first clock being associated with a first oscillator crystal, and the second clock being associated with a second oscillator crystal; and
store the frequency offset for use by the first radio and the second radio in the assistance mode.

28. The apparatus of claim 27, wherein the one or more trigger factors comprises an expected time for the first radio to initiate the assistance mode with the second radio, the instructions being further executable by the processor to:
trigger the measurement of the frequency offset prior to the expected time.

29. The apparatus of claim 27, wherein the instructions are further executable by the processor to:
measure the frequency offset between the first clock and the second clock based at least in part on a previously stored frequency offset.

30. A non-transitory computer-readable medium storing computer-executable code for wireless communication, the code executable by a processor to:
identify one or more trigger factors associated with an assistance mode, wherein a second radio associated with a second radio access technology (RAT) is used to assist a first radio associated with a first RAT;
measure a frequency offset between a first clock of the first radio and a second clock of the second radio based at least in part on the one or more trigger factors, the first clock being associated with a first oscillator crystal, and the second clock being associated with a second oscillator crystal; and
store the frequency offset for use by the first radio and the second radio in the assistance mode.

* * * * *